US011572638B2

(12) United States Patent
Qiao et al.

(10) Patent No.: US 11,572,638 B2
(45) Date of Patent: Feb. 7, 2023

(54) SPIDER-SILK-LIKE POLYMER FIBER, PREPARATION METHOD THEREFOR AND USE THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Jinliang Qiao, Beijing (CN); Chao Jiang, Beijing (CN); Guicun Qi, Beijing (CN); Xiaohong Zhang, Beijing (CN); Zhihai Song, Beijing (CN); Jinmei Lai, Beijing (CN); Chuanlun Cai, Beijing (CN); Binghai Li, Beijing (CN); Xiang Wang, Beijing (CN); Haibin Jiang, Beijing (CN); Jiangru Zhang, Beijing (CN); Yue Ru, Beijing (CN); Jianming Gao, Beijing (CN); Hongbin Zhang, Beijing (CN); Peng Han, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 460 days.

(21) Appl. No.: 16/627,929

(22) PCT Filed: Jun. 25, 2018

(86) PCT No.: PCT/CN2018/092645
§ 371 (c)(1),
(2) Date: Dec. 31, 2019

(87) PCT Pub. No.: WO2019/007217
PCT Pub. Date: Jan. 10, 2019

(65) Prior Publication Data
US 2021/0010162 A1 Jan. 14, 2021

(30) Foreign Application Priority Data

Jul. 1, 2017 (CN) .......................... 201710528418.3
Jul. 1, 2017 (CN) .......................... 201710528419.8
Jul. 1, 2017 (CN) .......................... 201710528427.2
Jul. 1, 2017 (CN) .......................... 201710528430.4
Jul. 1, 2017 (CN) .......................... 201710528431.9
Jul. 1, 2017 (CN) .......................... 201710528437.6

(51) Int. Cl.
*D01F 1/10* (2006.01)
*C08K 3/04* (2006.01)
(Continued)

(52) U.S. Cl.
CPC .................. *D01F 1/10* (2013.01); *C08K 3/04* (2013.01); *C08K 3/36* (2013.01); *C08K 3/40* (2013.01); *C08K 7/26* (2013.01); *C08K 7/28* (2013.01); *C08L 29/04* (2013.01); *D01D 1/02* (2013.01); *D01D 5/06* (2013.01); *D01D 5/14* (2013.01);
(Continued)

(58) Field of Classification Search
CPC ..... D01F 1/10; D01F 6/14; D01F 8/10; C08K 3/04; C08K 7/26; C08K 7/28; C08L 29/04; D01D 1/02; D01D 5/06; D01D 5/14
See application file for complete search history.

(56) References Cited

U.S. PATENT DOCUMENTS

2004/0155377 A1    8/2004   Kasabo et al.
2012/0115386 A1    5/2012   Jeong et al.

FOREIGN PATENT DOCUMENTS

CN    1584135 A    2/2005
CN    1807707 A    7/2006
(Continued)

OTHER PUBLICATIONS

CN 106012291 machine translation (Year: 2016).*
(Continued)

Primary Examiner — Edward J Cain
(74) Attorney, Agent, or Firm — Novick, Kim & Lee, PLLC; Allen Xue

(57) ABSTRACT

The invention relates to a spider-silk-like polymer fiber in the technical field of chemical bionics, a preparation method therefor and the use thereof. The spider-silk-like polymer fiber comprises a matrix polymer and a particle additive dispersed therein, wherein the particles have an average particle size of 0.1-1000 microns, and the polymer fiber has a spider-silk-like microstructure comprising a fiber body and spaced spindle knot structural units on the fiber body, wherein the spindle knot structural units comprise the particles, and the radial height of the spindle knot structural units is greater than the diameter of the fiber body. The preparation method of the polymer fiber of the invention does not require greatly modifying the existing spinning processes, and the equipment does not need to be changed, the process is simple, and the cost is low. The obtained spider-silk-like polymer fiber can realize the directional movement of water droplets on the surface of the fiber, thereby having a water gathering function and can be used for preparing water gathering materials.

78 Claims, 5 Drawing Sheets

(51) Int. Cl.
  C08K 3/36      (2006.01)
  C08K 3/40      (2006.01)
  C08K 7/26      (2006.01)
  C08K 7/28      (2006.01)
  C08L 29/04     (2006.01)
  D01D 1/02      (2006.01)
  D01D 5/06      (2006.01)
  D01D 5/14      (2006.01)
  D01F 6/14      (2006.01)
  D01F 8/10      (2006.01)
  C08K 3/34      (2006.01)

(52) U.S. Cl.
  CPC .............. *D01F 6/14* (2013.01); *D01F 8/10* (2013.01); *C08K 2003/343* (2013.01); *C08K 2201/005* (2013.01); *C08L 2203/12* (2013.01); *C08L 2205/14* (2013.01)

(56) References Cited

FOREIGN PATENT DOCUMENTS

| | | |
|---|---|---|
| CN | 101586289 A | 11/2009 |
| CN | 102162191 A | 8/2011 |
| CN | 102443867 A | 5/2012 |
| CN | 102517687 A | 6/2012 |
| CN | 102587139 A | 7/2012 |
| CN | 102776785 A | 11/2012 |
| CN | 103334244 A | 10/2013 |
| CN | 103643337 A | 3/2014 |
| CN | 103774266 A | 5/2014 |
| CN | 104846449 A | 8/2015 |
| CN | 105239206 A | 1/2016 |
| CN | 105339485 A | 2/2016 |
| CN | 105386155 A | 3/2016 |
| CN | 105951210 A | 9/2016 |
| CN | 106012291 A | 10/2016 |
| CN | 106702595 A | 5/2017 |
| JP | S4539055 B | 12/1970 |
| JP | S4539493 B | 12/1970 |
| JP | H03193908 A | 8/1991 |
| JP | 2000328351 A | 11/2000 |
| JP | 2000328352 A | 11/2000 |
| KR | 20080043729 A | 5/2008 |
| KR | 20120122826 A | 11/2012 |
| WO | 2001040356 A1 | 6/2001 |
| WO | 2001098395 A1 | 12/2001 |
| WO | 2017060709 A1 | 4/2017 |

OTHER PUBLICATIONS

Wang, Na et al.; Effect of mesoporous molecular sieve on properties of PE composite; China Synthetic Resin and Plastics, 2008, 25(1) 12-15; 1002-1396 (2008)01-0012-04.

Wang, Li et al.; Directional Motion and Adhesion of Tiny Droplets on Bioinspired Spindle-Knotted TiO2 Fibers; Chinese Journal of Inorganic Chemistry; Jan. 2014, vol. 30, No. 1, pp. 155-162.

Yu Jin et al.; Fabrication of Necklace-like Structures via Electrospinning; Langmuir, 2010, 26(2), 1186-1190; 1186 DOI: 10.1021/la902313t, published on Web Aug. 18, 2009.

* cited by examiner

SPIDER-SILK-LIKE POLYMER FIBER, PREPARATION METHOD THEREFOR AND USE THEREOF

TECHNICAL FIELD

The invention relates to the technical field of chemical bionics, more particularly, to a spider silk-like polymer fiber, a process for preparing the same and uses thereof.

BACKGROUND ART

Water resource is an important natural resource for development of human society. Although the quantity of water on the earth is huge, there is a very little thereof that can be directly utilized by human production and life, only about 0.26% of the total quantity of water on the earth. Sustainable utilization of the water resource is one of the most important issues in sustainable developments and utilizations of all natural resources. Nowadays, the shortage situation of fresh water resources is gradually emerging. Approximately 1.5 billion people in more than 80 countries in the world face a shortage of fresh water, wherein 0.3 billion people in 26 countries are completely living in a water shortage state. It is expected that by the year 2025, 3.0 billion people from all over the world will be confronted with water scarcity with more than 40 countries and regions being involved. The shortage of fresh water resources has restricted the development of society. Thus, it is extremely urgent to solve the problem of shortage of fresh water resources. Possible solutions may rely on the atmosphere, which has a content of 12900 billion tons of water vapor. The water vapor in atmosphere would possibly become an important "water source" for use in human life in the future. Spider is one of pioneers in the nature who utilize the atmosphere as water source. When a cobweb lies in a humid environment, water vapor will condense on the surface of capture silk therein to form small water droplets; the presence of periodical spindle knot structures in the fiber leads to periodical variations in the curvature radius of the capture silk, thereby to generate a Laplace pressure difference which causes the water droplets to be unevenly stressed in the fiber radial direction, and so the water droplets are pushed to directionally move (towards the spindle knots). Such a directional movement of the water droplets is favorable for quick gathering of small liquid droplets to form large water beads, thereby weakening the evaporation effect, and facilitating the rapid collection of water in the atmosphere. The way in which the spider collects water from the atmosphere by utilizing the above process to ensure the survival thereof provides a new idea for solving fresh water crisis: the development of a spider silk-like fiber with spindle knot structures to realize rapid collection of water from the atmosphere. This new idea has wide application prospects in desert, island and other areas, and it is expected to be used for dispersing water vapor in special places such as airports.

In the prior art, there are mainly two methods for preparing an artificial fiber having a similar structure to that of spider silk.

One method is an impregnation method: a water-collecting polymer filament imitating spider silk structure disclosed in the Chinese patent application with publication No. CN102776785A (application No. 201110223679.7) adopts this method. In this method, existing fibers are immersed in a polymer solution, and thereafter, they are taken out and dried; during the drying, the polymer solution forms a string of liquid droplets on the surface of the fibers and hangs thereon due to Rayleigh instability, and after drying and curing, axially arranged spindle knots are obtained, thereby to obtain fibers having a structure like spider silk. Based on the above patent application, the Chinese patent application with publication No. CN102587139A (application No. 201210004686.2) further realizes that the height of the protruding knots (i.e. spindle knots) on the surface of the prepared fiber is uniformly controllable from small to large, and there are more microscopic protrusions or micropores on the surface of the fiber, which improves the water collecting efficiency of the fiber. This method belongs to a post-processing treatment to existing fibers.

The other method is an electrostatic spinning method that has higher requirements on the equipment. The Chinese patent application with publication No. CN103334244A (application No. 201310227113.0) discloses a self-assembly preparation method of electrospun string-like fibers, wherein self-assembling occurs on the surface of artificial fibers to form micron-sized string-like structures by the electrospinning technique, thereby to obtain the artificial spider silk fibers. However, the electrospinning equipment is relatively expensive, and there are only a few kinds of polymers that can be used in the electrospinning method.

SUMMARY OF THE INVENTION

In view of the above problems in the prior art, the object of the present invention is to provide a spider silk-like polymer fiber that can achieve directional movement of water droplets on the surface of the fiber, thereby to have water collecting function. Meanwhile, the preparation process of the fiber is simple to conduct and low-cost in equipment.

It has been surprisingly found that the above object is achieved through the following protocols: micron-sized (typically, the average particle size of from 0.1 to 1000 microns) microparticle additive is introduced into the matrix polymer in a spinning process; the microparticles are neither dissolved nor molten during the spinning process of the matrix polymer, resulting in the formation of a polymer fiber with a spider silk-like microstructure, which comprises a fiber body and structural units of spindle knot distributed at intervals on the fiber body; the spindle knot structural units contain the above mentioned microparticles (each spindle knot structural unit may contain one or more of the microparticles). The spider silk-like microstructure of the polymer fiber in which the spindle knot structural units are distributed at intervals can result in the directional movement on the fiber surface of small water droplets formed during the condensation of water vapor, which can result in the formation of large water beads, thereby reducing the specific surface area of the water beads and the degree of the evaporation for forming the water beads, thereby to accelerate water vapor converging, so that the microstructure has the water-collecting function.

In the process of preparing the polymer fiber according to the invention, by adding micro-sized particles during the spinning, spindle knot structures can be just obtained during the preparation of the fiber, i.e., the spider silk-like polymer fiber is obtained in one-step process. Hence, the mentioned process does not need to change existing spinning processes and associated equipment greatly. In view of the process per se, the process is simpler, and it is lower-cost than existing processes. Especially in the case of porous microparticles, a microfiber network can be formed in the interior of the porous structure during the formation of the fiber, and thus the porous structure can enhance the interaction between the microparticle additive and the fiber matrix, thereby to reduce impacts of the microparticle additives on the mechanical properties of the fiber.

TERMS AND DEFINITIONS

The term "distributed at intervals" herein means that two adjacent spindle knot structural units distributed on a fiber are connected by the fiber, i.e., what is disposed between the two adjacent spindle knot structural units is the fiber body part.

The term "fiber body" refers to the linear main body structure of a fiber, which is distributed between spindle knot structural units, or in other words, to the main constituent part of the fiber that is spaced apart by the spindle knot structural units.

The term "spindle-knot" refers to a spindle-shaped structure that protrudes radially outwards from the fiber body. The radial height of the spindle knots is greater than the diameter of the fiber body. The term "spindle-shaped" means that the structure is thick in the middle, and narrow and sharp at the two ends.

Specifically, for example, the SEM (Scanning Electronic Microscopy) photograph as shown in FIG. 6 and the Optical Microscopy photograph as shown in FIG. 10 indicate these structures and the related parameters. The spindle knot structural units are indicated as "1", and the fiber body is indicated as "2".

The radial height "a" of the spindle knot structural units refers to, for a single spindle knot structural unit, a vertical distance between its top endpoint and its bottom endpoint farthest away from the fiber axis in the fiber radial direction.

The axial length "b" of the spindle knot structural units refers to, for a single spindle knot structural unit, a distance between the starting point and the ending point of the spindle knot that protrudes radially outwards from the fiber body in the fiber axial direction. Typically, the starting point and the ending point are designated as the locations that vary by about 5% from the diameter of the fiber body.

The spacing "d" of the spindle knot structural units refers to the distance between adjacent endpoints (starting point or ending point) of the two adjacent spindle knot structural units in the fiber axial direction.

The diameter "c" of the fiber body refers to the diameter of the fiber body, i.e., a part of the fiber, which is free of the spindle knot structures. As for the fiber comprising the spindle knot structural units, the average value of the diameters of a plurality of sections of the fiber body (usually, clearly visible three sections in SEM photographs) that are spaced apart by the spindle knots on the same one fiber is taken as the diameter of the body of the whole fiber.

The fiber axial direction refers to the fiber machine direction, also to the direction in which the fiber body longitudinally extends.

The fiber radial direction refers to the direction vertical to the fiber axial direction, i.e., the direction vertical to the fiber machine direction.

The sizes of the fiber body and spindle nodes or the particle size of the microparticles described herein are determined by the SEM method, unless explicitly stated otherwise.

DETAILED DESCRIPTION OF THE INVENTION

Specifically, the present invention provides the following technical solutions.

In a first aspect, the present invention provides a spider silk-like polymer fiber, wherein the polymer fiber comprises a matrix polymer and a microparticle additive dispersed therein, the microparticles having an average particle size of 0.1-1000 microns, and the polymer fiber having a spider silk-like microstructure comprising a fiber body and spindle knot structural units distributed at intervals on the fiber body, wherein the spindle knot structural units contain the microparticles, and the radial height of the spindle knot structural units is greater than the diameter of the fiber body.

Preferably, the radial height of the spindle knot structural units is 10-300 microns, preferably from 20-200 microns, and more preferably 30 to 150 microns; the axial length is 10-1000 microns, preferably 20-700 microns, more preferably 40-300 microns, and even more preferably 100-300 microns; and the spacing is 10-5000 microns, preferably 50-3000 microns, and more preferably 100-1000 microns.

The diameter of the fiber body may be 5-250 microns, preferably 5-200 microns, more preferably 10-150 microns, more preferably 10-100 microns, and even more preferably 20-50 microns.

The matrix polymer of the fiber may be various fiber-forming polymers known in the art, preferably polymers suitable for wet spinning, such as those selected from the group consisting of polyacrylonitrile, polyurethane, polyvinyl alcohol, viscose fiber, nylon, cellulose sulfonate, cellulose acetate, polyvinyl chloride, polyisophthalamide (preferably poly(m-phenylene isophthalamide)), poly(p-phenylene terephthamide), and their blends and copolymers; preferably the group consisting of polyacrylonitrile, polyurethane, polyvinyl alcohol, viscose fiber, poly(m-phenylene isophthalamide), poly(p-phenylene terephthalamide), polyvinyl chloride and their blends and copolymers, more preferably the group consisting of polyacrylonitrile, polyurethane, polyvinyl alcohol and their blends and copolymers, and even more preferably from polyvinyl alcohol. The polymerization degree of the polyvinyl alcohol is suitably 400-4000, preferably 500-3000, and more preferably 1000-2500; the alcoholysis degree of the polyvinyl alcohol is suitably 55%-99%, preferably 88%-99%.

The microparticles used in the present invention may be any suitable micron-sized particles having an average particle size of 0.1-1000 microns, preferably 0.5-200 microns, and more preferably 10-100 microns. The microparticles may be solid microparticles (e.g., solid glass microspheres), porous microparticles, or agglomerates formed from nanoparticles (e.g., spray-dried powder rubber).

The polymer fiber according to the invention may comprise 1-50% by weight of the microparticle additive, based on the weight of the matrix polymer of the fiber. When porous microparticles are used as the microparticles, the polymer fiber preferably comprises the following components in parts by weight:

a. 100 parts of the matrix polymer of the fiber;
b. 1-50 parts, preferably 3-40 parts, more preferably 5-30 parts, more preferably 5-25 parts, and even more preferably 5-20 parts, of the porous microparticles.

The matrix polymer of the fiber in the component a as a fiber matrix and the porous microparticles in the component b as an additive form the spindle knot structures.

The porosity of the porous microparticles is preferably 10-80%, preferably 20-60%, and more preferably 20-50%.

The pore diameter of the porous microparticles is preferably 0.1-200 nm, more preferably 0.5-150 nm, and even more preferably 1-50 nm.

The porous microparticles include spherical porous microparticles and non-spherical porous microparticles.

The average particle size of the spherical porous microparticles is preferably 0.5-200 μm, more preferably 10-150 μm, and even more preferably 20-100 μm.

The average particle size of the non-spherical porous microparticles may be 60-12500 meshes, preferably 80-1250 meshes, and more preferably 80-600 meshes, as determined by the sieving method.

The porous microparticles may be various commercially available porous microparticles that meet the parameters described herein, or may be self-made by the methods known in the art.

For example, the spherical porous microparticles may be selected from the group consisting of silica porous microspheres, polystyrene porous microspheres, calcium carbonate porous microspheres, epoxy resin porous microspheres, polylactic acid porous microspheres, phenolic resin porous microspheres, chitosan porous microspheres, carbon porous microspheres, hydroxyapatite porous microspheres, gelatin porous microspheres, metal porous microspheres and combinations thereof, preferably the group consisting of silica porous microspheres, polystyrene porous microspheres, calcium carbonate porous microspheres, epoxy resin porous microspheres, polylactic acid porous microspheres, phenolic resin porous microspheres, chitosan porous microspheres, carbon porous microspheres and combinations thereof, and more preferably the group consisting of silica porous microspheres, polystyrene porous microspheres, calcium carbonate porous microspheres, carbon porous microspheres and combinations thereof.

When the spherical porous microparticles are used as the microparticles, the polymer fiber preferably comprises the following components in parts by weight:
a. 100 parts of the matrix polymer of the fiber;
b. 1-49 parts, preferably 3-40 parts, more preferably 5-30 parts, and most preferably 5-25 parts, of the spherical porous microparticles.

When the silica porous microspheres are used as the microparticles, the polymer fiber preferably comprises the following components in parts by weight:
a. 100 parts of the matrix polymer of the fiber;
b. 1-45 parts, preferably 3-40 parts, more preferably 5-30 parts, and even more preferably 5-25 parts, of the silica porous microspheres.

When the polystyrene porous microspheres are used as the microparticles, the polymer fiber preferably comprises the following components in parts by weight:
a. 100 parts of the matrix polymer of the fiber;
b. 1-46 parts, preferably 3-40 parts, more preferably 5-30 parts, and most preferably 5-25 parts, of the polystyrene porous microspheres.

The non-spherical porous microparticles may be selected, for example, from the group consisting of molecular sieves, silica gel for column chromatography, non-spherical polystyrene microparticles, non-spherical titanium dioxide porous microparticles and combinations thereof, preferably the group consisting of molecular sieves, silica gel for column chromatography, non-spherical polystyrene microparticles and combinations thereof, and more preferably the group consisting of silica gel for column chromatography, non-spherical polystyrene microparticles and combinations thereof. The average particle size of the silica gel for column chromatography may be 60-400 meshes, preferably 60-300 meshes, more preferably 80-300 meshes, as determined by the sieving method.

When the non-spherical porous microparticles are used as the microparticles, the polymer fiber preferably comprises the following components in parts by weight:
a. 100 parts of the matrix polymer of the fiber;
b. 1-48 parts, preferably 3-40 parts, more preferably 5-30 parts, and most preferably 5-25 parts, of the non-spherical porous microparticles.

When the silica gel for column chromatography is used as the microparticles, the polymer fiber preferably comprises the following components in parts by weight:
a. 100 parts of the matrix polymer of the fiber;
b. 1-44 parts, preferably 3-40 parts, more preferably 5-30 parts, and most preferably 5-25 parts, of the silica gel for column chromatography.

When the spray-dried powder rubber is used as the microparticles, the polymer fiber preferably comprises the following components in parts by weight:
a. 100 parts of the matrix polymer of the fiber;
b. 1-50 parts, preferably 10-40 parts, more preferably 10-30 parts, and even more preferably 20-30 parts, of the spray-dried powder rubber.

The matrix polymer of the fiber in the component a as a fiber matrix and the component b as an additive form spindle knot structures.

The average particle size of the spray-dried powder rubber is preferably 500 nm-200 μm, more preferably from 10 μm-100 μm, and even more preferably 20 μm-50 μm.

The spray-dried powder rubber used in the invention is prepared by irradiation crosslinking of a rubber emulsion and drying by the spray drying method. In the preparation process of the spray-dried powder rubber, a high-energy radiation source used for the irradiation crosslinking can be at least one selected from a cobalt source, ultraviolet and a high-energy electron accelerator. Preferably, the high-energy radiation source has a wavelength of less than 0.1 μm, such as a cobalt source. In addition, normally, the irradiation should be in such a dose that the gel content of rubber particles obtained by irradiation crosslinking of a rubber latex can reach 60% by weight or more, preferably 75% by weight or more, and more preferably 80% by weight or more. Particularly, the dose of the irradiation may be 0.1-30 Mrad, preferably 0.5-20 Mrad.

As the spray-dried powder rubber, various spray-dried powder rubbers known in the art can be used. The spray-dried powder rubber may be commercially available or prepared by various methods well known to a person skilled in the art. For example, the spray-dried powder rubber may be fully-vulcanized powder rubber prepared according to the methods as disclosed in international patent application WO01/40356A1 that was filed by the applicant of the present invention on Sep. 18, 2000 and published on Jun. 7, 2001 and the international patent application WO01/98395A1 that was filed on Jun. 15, 2001 and published on Dec. 27, 2001. Moreover, examples of the fully-vulcanized powder rubber include, but are not limited to, at least one of fully-vulcanized powder natural rubber, fully-vulcanized powder styrene-butadiene rubber, fully-vulcanized powder carboxylated styrene-butadiene rubber, fully-vulcanized powder nitrile butadiene rubber, fully-vulcanized powder carboxylated nitrile butadiene rubber, fully-vulcanized powder polybutadiene rubber, fully-vulcanized powder silicone rubber, fully-vulcanized powder chloroprene rubber, fully-vulcanized powder acrylate rubber, fully-vulcanized powder styrene-butadiene-vinylpyridine rubber, fully-vulcanized powder isoprene rubber, fully-vulcanized powder butyl rubber, fully-vulcanized powder polysulfide rubber, fully-vulcanized powder acrylate-butadiene rubber, fully-vulcanized powder polyurethane rubber, fully-vulcanized powder fluoro rubber, and fully-vulcanized powder ethylene-vinyl acetate rubber and the like, preferably at least one of fully-vulcanized powder styrene-butadiene rubber, fully-vulcanized powder carboxylated styrene-butadiene rubber, fully-vulcanized powder nitrile butadiene rubber, fully-vulcanized powder carboxylated nitrile butadiene rubber, fully-vulcanized powder acrylate rubber, and fully-vulcanized powder ethylene-vinyl acetate rubber. The gel content of the fully-vulcanized powder rubber is preferably 60% by weight or more, more preferably 75% by weight or more, and particularly preferably 80% by weight or more.

In addition, during preparation via the irradiation crosslinking of the spray-dried powder rubber, a crosslinking aid may be used or not be used. The crosslinking aid may be any one selected from the group consisting of mono-functional crosslinking aids, di-functional crosslinking aids, tri-functional crosslinking aids, tetra-functional crosslinking aids, and penta- or more-functional crosslinking aids. Examples of the mono-functional crosslinking aids include, but are not limited to, at least one of octyl (meth)acrylate, isooctyl (meth)acrylate, and glycidyl (meth)acrylate; examples of the di-functional crosslinking aids include, but are not limited to, at least one of 1,4-butanediol di(meth)acrylate, 1,6-hexanediol di(meth)acrylate, diethylene glycol di(meth)acrylate, triethylene glycol di(meth)acrylate, neopentyl glycol di(meth)acrylate, and divinylbenzene; examples of the tri-functional crosslinking aids include, but are not limited to, trimethylolpropane tri(meth)acrylate and/or pentaerythritol tri(meth)acrylate; examples of the tetra-functional crosslinking aids include, but are not limited to, pentaerythritol tetra(meth)acrylate and/or ethoxylated pentaerythritol tetra(meth)acrylate; examples of the penta- or more-functional crosslinking aids include, but are not limited to, dipentaerythritol penta(meth)acrylate. Herein, the (meth)acrylate refers to an acrylate or a methacrylate. These crosslinking aids may be used in combination by any way as long as they are helpful for the crosslinking under irradiation. In addition, the crosslinking aids are generally added in an amount of 0.1-10% by weight, preferably 0.5-9% by weight, and more preferably 0.7-7% by weight, based on the weight of the dry rubber in the latex.

In a second aspect, the present invention provides a process for the preparation of the spider silk-like polymer fiber according to the invention. The process is carried out by the means of a wet spinning process. Specifically, the process comprises the following steps:

(1) dispersing the matrix polymer of the fiber and the microparticle additive in a solvent in the amounts as described above until the matrix polymer of the fiber is dissolved in the solvent to form a solution and the microparticles are uniformly dispersed in the solution, thereby to obtain a uniform spinning dope; in this step, advantageously, the mixture may be heated at temperatures of 30-95° C., preferably 50-95° C., and more preferably 70-95° C., and can be stirred at the same time;

(2) formulating a corresponding coagulation bath according to the polymer and solvent used;

(3) spinning with the spinning dope by extruding the spinning dope, for example through a wet spinning machine or a peristaltic pump, into the coagulation bath, and after coagulating and drying, collecting the primary fiber;

(4) optionally, stretching the primary fiber to obtain a spider silk-like polymer fiber having spindle knot structures distributed at intervals; for example, in the case where the microparticles are porous microparticles, the stretching of step (4) is performed; in the case where the microparticles are spray-dried powder rubber, the stretching of step (4) is not performed.

If necessary, after the above steps, the process further comprises the following crosslinking step (5): the fiber obtained in step (3) or (4) is immersed in a crosslinking solution, and after washing with water and drying, the resulting product is collected. The crosslinking step can change the water resistance of the fiber, but does not affect the basic physical structure of the fiber, i.e., the spaced-apart spindle knot structures, and thus it will not affect the directional movement of water droplets on the surface of the fiber. Hence, the crosslinking step is only an optional step.

Specifically, in step (1), based on 100 weight parts of the solvent, the amount of the matrix polymer of the fiber may be 5-50 weight parts, preferably 10-40 weight parts, and more preferably 10-25 weight parts.

In step (1), the solvent may be any commonly-used wet spinning solvent corresponding to the polymer used, for example, selected from the group consisting of 1,4-dioxane, N,N-dimethylformamide, tetrahydrofuran, water, sulfuric acid and combinations thereof, more preferably the group consisting of N,N-dimethylformamide and 1,4-dioxane and combinations thereof.

In step (2), the coagulation bath may be a commonly-used wet spinning coagulation bath corresponding to the matrix polymer of the fiber used. The mixing process may use any existing liquid-liquid mixing equipment, such as those for mechanical stirring, ultrasonic dispersion, etc. The coagulation bath may be selected from the group consisting of a sodium sulfate aqueous solution, methanol, ethyl acetate, water, 1,4-dioxane, N,N-dimethylformamide, and combinations thereof, preferably the group consisting of a sodium sulfate aqueous solution, methanol, water, 1,4-dioxane, N-dimethylformamide, and combinations thereof; preferably, the concentration of the sodium sulfate aqueous solution is 300-500 g/L, preferably 350-450 g/L. If an aqueous solution of polyvinyl alcohol is selected as the spinning dope, at least one of the sodium sulfate aqueous solution, methanol and ethyl acetate, wherein the concentration of the sodium sulfate aqueous solution may be 300-500 g/L, preferably 350-450 g/L, preferably at least one of the sodium sulfate aqueous solution and methanol, and more preferably the sodium sulfate aqueous solution, may be selected as the coagulation bath. If a polyvinyl alcohol solution in 1,4-dioxane is selected as the spinning dope, at least one of methanol and ethyl acetate or a binary solution of methanol and 1,4-dioxane may be selected as the coagulation bath. In the binary solution of methanol and 1,4-dioxane, 1,4-dioxane may be used in an amount of 0.1-50 weight parts, preferably 5-40 weight parts, more preferably 10-30 weight parts, based on 100 weight parts of methanol.

Because pure methanol has a high coagulation ability so that fibers will quickly coagulate, which is disadvantageous for drawing fine fibers in subsequent taking-up step and protruding from the fibers to form spindle knot structures, thus a suitable amount of 1,4-dioxane may be added to the coagulation bath according to needs, to reduce the forming rate of the fibers, thereby to facilitate the formation of the spindle knot structures.

When the spinning dope is used for spinning, the spinneret is a spinneret commonly used in the spinning process. The inner diameter of the spinneret orifice may be 10-1000 microns, preferably 50-500 microns, and more preferably 50-300 microns; the spinneret may be in any shapes, preferably square, circular, triangular or pentagonal, more preferably circular, square or triangular, and even more preferably circular.

In step (3), when the microparticles are porous microparticles, the taking-up rate may be 0.01-100 m/min, preferably 0.05-10 m/min, and more preferably 0.1-1 m/min; when the microparticles are spray-dried powder rubbers, the taking-up rate may be 0.1-100 m/min, preferably 0.1-10 m/min, and more preferably 0.2-1 m/min.

In step (4), the stretching temperature may be a commonly-used stretching temperature corresponding to the used matrix polymer of the fiber. If polyvinyl alcohol is used as the matrix polymer of the fiber, the stretching temperature may be 100-220° C., preferably 120-200° C., and more preferably 150-180° C.

In step (5), the crosslinking solution may be a commonly-used crosslinking solution for wet spinning corresponding to the matrix polymer of the fiber used.

If polyvinyl alcohol is used as the matrix polymer of the fiber, the crosslinking solution may consist of a solution of an acid and an aldehyde, and/or sodium sulfate, with water. In other word, the crosslinking solution may be an aqueous solution of an acid and an aldehyde, and sodium sulfate may be optionally added. The acid can be a common inorganic acid, preferably at least one of hydrochloric acid and sulfuric acid, more preferably sulfuric acid; the aldehyde is preferably at least one of formaldehyde and glutaraldehyde. Particularly, the crosslinking solution is preferably an aqueous solution of sulfuric acid, glutaraldehyde (and/or formaldehyde) and sodium sulfate with water, wherein the concentration of sulfuric acid may be 100-500 g/L, preferably 200-350 g/L; the concentration of glutaraldehyde may be from 1 to 80 g/L, preferably from 30 to 60 g/L; the concentration of formaldehyde can be 1-50 g/L, preferably 20-35 g/L; the concentration of sodium sulfate may be from 0 to 350 g/L, preferably from 50 to 200 g/L.

When the microparticles are porous microparticles, the polymer and the porous microparticle additive are co-spun, in which the porous microparticles are dispersed in the polymer solution, and the polymer solution diffuses into the inside of the porous microparticles; while microfluids of the spinning dope pass through the coagulation bath to form fibers and the fibers are subsequently stretched, the solvent is continuously isolated and the fibers are radially stretched, and thus the volume of the fiber body shrinks greatly, whereas the volume of the porous microparticles is not affected. Thus, the fibers will microscopically protrude at the positions where the porous microparticles exist to form spindle knot structures; the polymer solution entering the interior of the porous microparticles will coagulate to form a microfiber network which can bind the porous microparticles inside the fibers, thereby effectively enhance the interaction force between the porous microparticles and the fiber matrix and reduce the effect of the microparticle additive on the mechanical properties of the fibers. The process is simple, without a lot of improvements made to existing processes, and thus it is easy for industrialized production. As for the obtained artificial fibers, in the case of a high humidity (for example, a relative air humidity of above 80%), water vapor coagulates on the surface of the fibers, and subsequently, small liquid droplets combine towards the spindle knot structural parts and quickly converge to form big water droplets, to facilitate water collections.

When the microparticles are spray-dried powder rubber, the polymer and the powder rubber are co-spun, in which the spray-dried powder rubber is dispersed in the polymer solution. During forming fibers by passing the solution through the coagulation bath, the volume of the fiber body greatly shrinks as the solvent is continuously isolated, whereas the volume of the spray-dried powder rubber is not affected. Thus, the fibers will microscopically protrude to form spindle knot structures in the part where the spray-dried powder rubber exists, while in the part where the spray-dried powder rubber does not exist, the fibers will naturally shrink to form the fiber body, thereby to obtain spider silk-like fibers having water collecting property. This process can achieve one-time forming and the process is simple, so that it is easy for industrialized production. The obtained artificial fibers can collect droplets under high humidity (for example, relative air humidity of above 80%), in which water vapor is merged from the fiber body (high curvature radius) part to the spindle knot structure (low curvature radius) part during the coagulation and growth processes, which accelerates the converging of the water droplets at the protrusion portions, thereby to facilitate the water collection.

The invention has the following advantages:
(1) the process is simple, and it can be realized by using traditional spinning equipment without additionally adding equipment; the process is simple and stable, and it is suitable for continuous large-scale production;
(2) the spider silk-like fibers with spindle knot structures distributed at intervals, as obtained in the invention, are low in cost and exhibit good stability;
(3) the spider silk-like fiber with spindle knot structures distributed at intervals, obtained in the invention, may be used for collecting moisture in the atmosphere in areas such as islands, coastal deserts, and foggy mountainous areas, and dispersing and dissipating dense fog around special places such as airports, highways, or lighthouses;
(4) in the case of using a porous material as an additive, the interfacial interaction between the additive and the matrix material is enhanced: the micro-fiber network formed during the coagulation binds the porous microparticles additive in the interior of the fibers, which reduces the effect of the additive on the mechanical properties of the fibers.

BRIEF DESCRIPTION OF THE DRAWINGS

As shown in FIG. 1, the fiber has spindle knot structures distributed at intervals. The darker part in the spindle knots is just the silica microsphere which has weaker light transmission, and the formation of the spindle knots just occurs under the effect of the microspheres.

FIG. 2 and FIG. 3 each are the photographs of the sample prepared in Example B1. FIG. 2 is the photograph of the section of spindle knot structures, and FIG. 3 is a photograph of a long pure fiber section between two adjacent spindle knots, and thus no spindle knot appears in FIG. 3. As shown in FIG. 3, the surface of this fiber section is smooth and even when observed under a microscope.

As shown in FIG. 2 and FIG. 4, due to the presence of the non-spherical porous microparticles, spindle knot structures are formed. In the spindle knot structures, the darker part is the additive which has weaker light transmission, and it exhibits various non-spherical irregular shapes.

FIG. 1, FIG. 2 and FIG. 4 respectively show the microstructures of the obtained fibers in the case of different amounts of porous microparticles, including the size and distributions of the spindle knot structures. As the amount of the porous microparticles increases, the spindle knot structures become larger in size and denser. Therefore, by adjusting the size and amount of the porous microparticles, fibers having different structures may be obtained.

FIGS. 5-7 show the microstructures of the fibers obtained in the case of different amounts of powder rubber, including the size and distribution of spindle knot structures (spindle knots), respectively. As the amount of the powder rubber increases, the spindle knot structures become larger in size and denser. Therefore, by adjusting the size and amount of the powder rubber, fibers having different structures may be obtained.

FIG. 8 serves as a comparative example, showing that in the case of no powder rubber added, there is no spindle knot structure.

Figure 9:
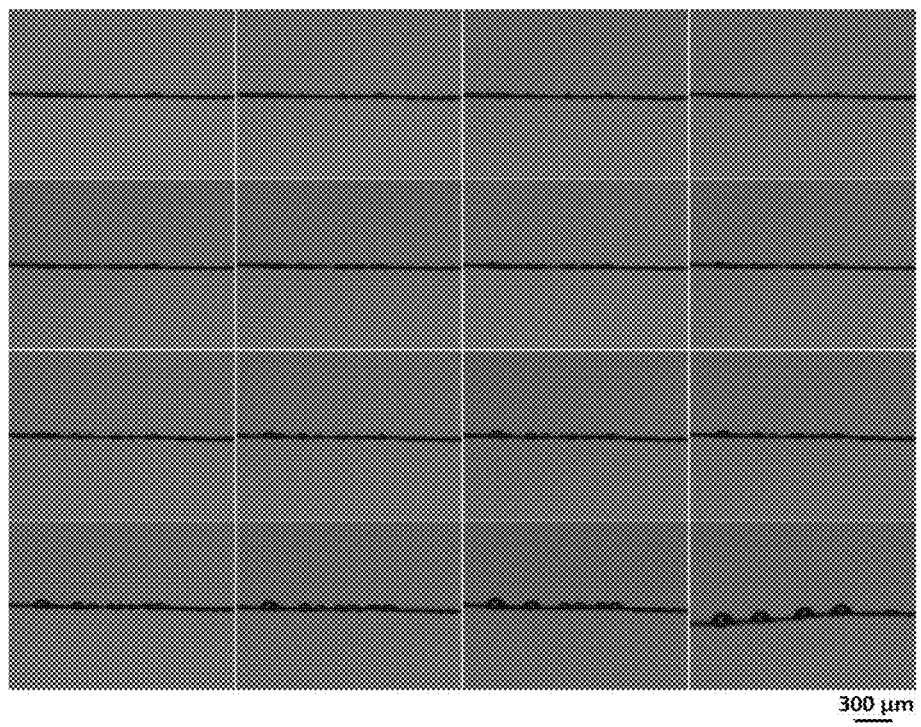
FIG. 9 shows optical photographs of water collection of the spider silk-like polymer fiber prepared in Example A6 (the order of the pictures: from left to right, from top to bottom).

As it can be seen from FIG. 9, during the condensation of water vapor, small droplets first form on the surface of the fiber randomly. Due to the presence of the spindle knot structures, the curvature radius of the fiber around the spindle knot structures varies, and thus, under a Laplace pressure difference, water droplets move toward the spindle knot structures, which accelerates the formation of large water beads, thereby to reduce specific surface area and volatilization degree. After small droplets are formed again in other positions, the above situation is repeated to accelerate converging of water beads. Thus, the fiber can be used in water vapor collection.

Figure 10:
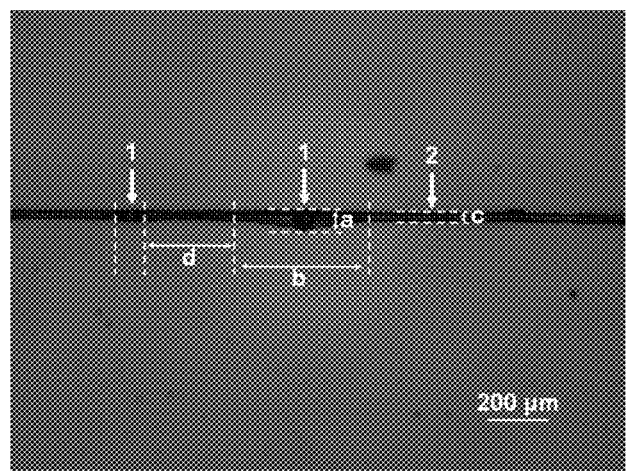
FIG. 10 is an optical microscope photograph of a spider silk-like polymer fiber based on polystyrene porous microspheres prepared in Example C3.

As shown in FIG. 10, the fiber forms the spindle knot structures at the positions where the polystyrene microparticles exist. In the figure, the darker spherical section has weaker light transmission, and the formation of the spindle knots just occurs under the effect of the microspheres.

EXAMPLES

The invention will be further illustrated with reference to the examples in the following. However, the invention is not limited by these examples.

The following instruments and equipment, measurement methods, raw materials and experimental conditions are used in the examples:

(1) Experimental basic equipment: the extrusion equipment is a peristaltic pump, Model: SPLab01, produced by Baoding Shenchen Pump Industry Co., Ltd, and the thermal stretching equipment is an INSTRON 3366 universal tester.

(2) Instruments and methods for determining experimental data

The optical microscope photographs (FIGS. 1-4, 9 and 10) were taken by a NIKON ECLIPSE IC100N POL-model microscope; the scanning electron microscope photographs (FIGS. 5-8) were taken by a scanning electron microscope, Model: Hitachi S-4800.

The procedure of the directional movement of water droplets on the fiber surface was observed by a contact angle measuring instrument, Model: SCA20, from Dataphysics Company, Germany.

The tensile properties of fibers were tested by using a monofilament method in accordance with ASTM D3379-1975 ("Standard Test Method for Tensile Strength and Young's Modulus for High-Modulus Single-Filament Materials"). The tensile strength at break was measured by an Instron 3366 universal material tester.

The diameter of the fiber body, and the radial height, axial length and spacing of the spindle knot structural units were measured by taking an electron microscope photograph with a Hitachi S-4800-model scanning electron microscope in accordance to the SEM method.

The average particle size of spherical microparticles (e.g., porous microspheres, spray-dried powder rubber, and solid glass spheres) was obtained by taking an electron microscope photograph with a Hitachi S-4800-model scanning electron microscope in accordance to the SEM method, and then making statistics of the test results obtained by the scanning electron microscope. Particularly, the particles were dried and uniformly dispersed to prepare an SEM sample, and a clear SEM photograph with morphology information of particles was taken. By randomly making statistics of the particle size information of the microparticles (usually selecting 50 microparticles in each photograph) in a plurality of SEM photographs (usually 10 photographs), the number average value of the particle sizes of these selected microparticles was calculated as the average particle size of the microparticle sample.

The porosity and the pore diameter were measured by an ASAP 2020 M+C full-automatic physicochemical adsorption analyzer produced by Micromeritics company, USA, according to GB/T21650.

The average particle size (mesh number) of the non-spherical microparticles was determined by the sieving method: a series of standard sieves (ISO 3310-1:2000) having different sieve pore diameters were selected, and they were fixed on a vibrating screener by stacking in order from the bottom to the top according to the pore diameter from small to large, in which a bottom sieve is at the bottom and a sieve cover is at the top, to accomplish the sieving by vibration; according to the mass of the particles obtained in each layer of standard sieves, the particle size distribution and particle size of the particles can be obtained. The particles are baked and dispersed before sieving.

(3) The microparticles used in the examples were dried in an oven prior to use, unless explicitly stated otherwise.

(4) In the examples, the term "high humidity" refers to a relative air humidity of 80%.

Example 1

7 g of polyvinyl alcohol (PVA 1799, Aladdin, polymerization degree of 1700, alcoholysis degree of 99%) and 1.05 g of silica porous microspheres were dispersed in 43 g of 1,4-dioxane (DMSO), and stirred and heated at 80° C. for 2 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; by thoroughly drying and collecting, a primary fiber was obtained; it was thermally stretched at 180° C. to 8 times the original length, to produce the spider silk-like fiber that was tested, and the test results were shown in FIG. 1. As for the obtained fiber, the fiber body had a diameter of 27 microns, the spindle knots had a radial height of 40-70 microns and an axial length of 50-400 microns, and the spacing of the spindle knots was 70-2000 microns.

The above fiber was tested for its mechanical properties, and its tensile strength at break was 342±22 MPa.

The above silica porous microspheres are prepared according to the following process: 1 kg of a silicone rubber latex (Beijing Borer New Material Technology Co., Ltd., Model: 302) with a solid content of 28% was charged into a container and dropwise added with 15 g of isooctyl acrylate under stirring, and after completion of dropwise addition, stirring was continued for one hour and then irradiated by a cobalt source at a dose of 2.5 Mrad and a dose rate of 50 Gy/min. The irradiated latex was spray-dried by a spray dryer with the inlet temperature of the spray dryer of 140-160° C. and the outlet temperature of the spray dryer of 60-70° C. The dried silicone rubber powder was collected, and calcined at 600° C. for 6 hours (3 hours in an oxygen-free environment and 3 hours in an oxygen environment in order), and thereafter, it was sieved to produce the silica porous microspheres having a particle size of 20-50 microns, a pore diameter of 20-100 nanometers and a porosity of 20-60%, for use in this example.

Example A1

7 g of polyvinyl alcohol (PVA 1799, Aladdin, polymerization degree of 1700, alcoholysis degree of 99%) and 0.7 g of carboxylated styrene-butadiene spray-dried powder rubber were dispersed in 43 g of 1,4-dioxane (DMSO), and stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.01 ml/min, the model of the spinneret was 25G (circular, the diameter of 260 microns), the taking-up rate was 0.42 m/min, and the fiber was in the coagulation bath for at least 5 minutes; after thoroughly drying in the air, the obtained fiber was collected to give the spider silk-like polymer fiber that was tested, and the test results were shown in FIG. 5. As for the obtained fiber, the body had a diameter of 30 microns, the spindle knot structural units had a radial height of 40-100 microns and an axial length of 50-200 microns, and the spacing of the spindle knots is 70-3000 microns. The fiber was tested for its mechanical properties, and its tensile strength at break was 94±12 MPa.

The above carboxylated styrene-butadiene spray-dried powder rubber was prepared according to the following process: 1 kg of a carboxylated styrene-butadiene latex (produced by Yanshan Petrochemical company, Brand: XSBRL-54B1) with a solid content of 50% was charged into a container and dropwise added with 15 g of isooctyl acrylate under stirring, and after completion of dropwise addition, stirring was continued for one hour and then irradiated by a cobalt source at a dose of 2.5 Mrad and a dose rate of 50 Gy/min. The irradiated latex was spray-dried by a spray dryer, with the inlet temperature of the spray dryer of 140-160° C. and the outlet temperature of the spray dryer of 60-70° C. The dried carboxylated styrene-butadiene rubber powder was collected and sieved to produce the carboxylated styrene-butadiene rubber powder sample having an average particle size of 30 microns for use in this example.

Comparative Example A1

7 g of polyvinyl alcohol (PVA 1799, Aladdin, polymerization degree of 1700, alcoholysis degree of 99%) were dispersed in 43 g of 1,4-dioxane (DMSO), and stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.01 ml/min, the model of the spinneret was 25G (circular, the diameter of 260 microns), the taking-up rate was 0.42 m/min, and the fiber was in the coagulation bath for at least 5 minutes. The obtained fiber was thoroughly dried in the air and then was tested, and the test results were shown in FIG. 8.

Example A2

7 g of polyvinyl alcohol (PVA 1799, Aladdin, polymerization degree of 1700, alcoholysis degree of 99%) and 1.4 g of carboxylated styrene-butadiene spray-dried powder rubber (the same as that in Example A1) were dispersed in 43 g of 1,4-dioxane (DMSO), and stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.01 ml/min, the model of the spinneret was 25G (circular, the diameter of 260 microns), the taking-up rate was 0.42 m/min, and the fiber was in the coagulation bath for at least 5 minutes. The obtained fiber was thoroughly dried in the air and then was collected to produce a spider silk-like polymer fiber having the water collecting characteristic. The fiber was tested, and the test results were shown in FIG. 6. As for the obtained fiber, the fiber body had a diameter of 30 microns, the spindle knot structural units had a radial height of 40-100 microns and an axial length of 50-200 microns, and the spacing of the spindle knots was 50-2200 microns.

Example A3

Figure 1:
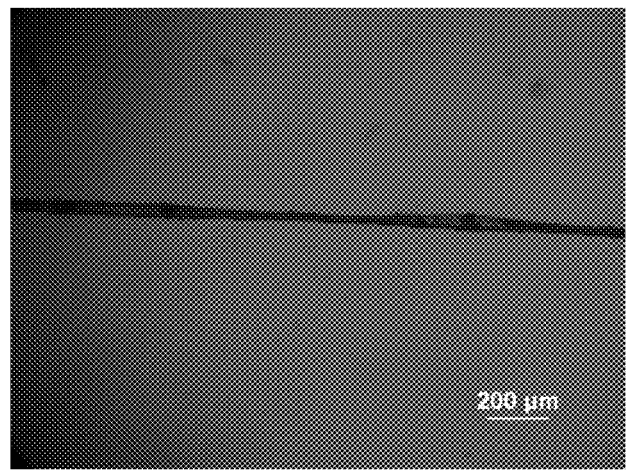
FIG. 1 is an optical microscope photograph of the spider silk-like polymer fiber based on silica porous microspheres prepared in Example 1.
Figure 2:
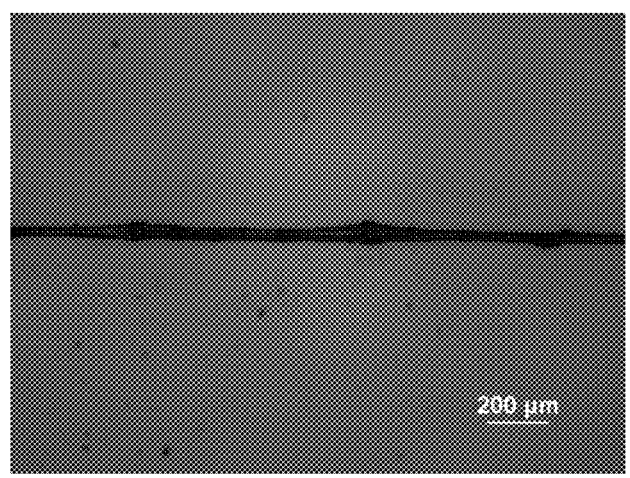
FIG. 2 is an optical microscope photograph of the spider silk-like polymer fiber prepared in Example B1.
Figure 3:
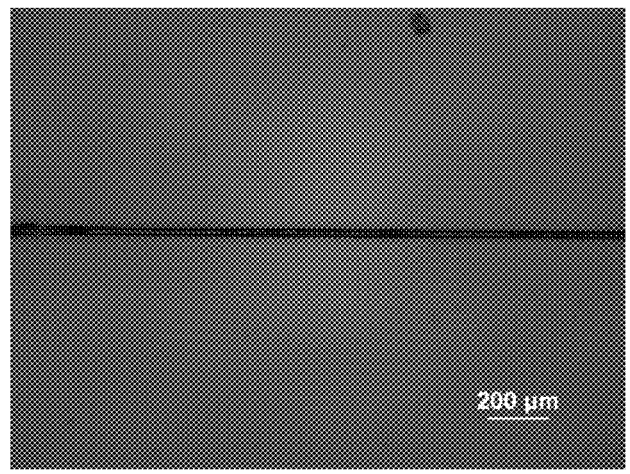
FIG. 3 is an optical microscope photograph of the spindle knot-free section of the spider silk-like polymer fiber prepared in Example B1.
Figure 4:
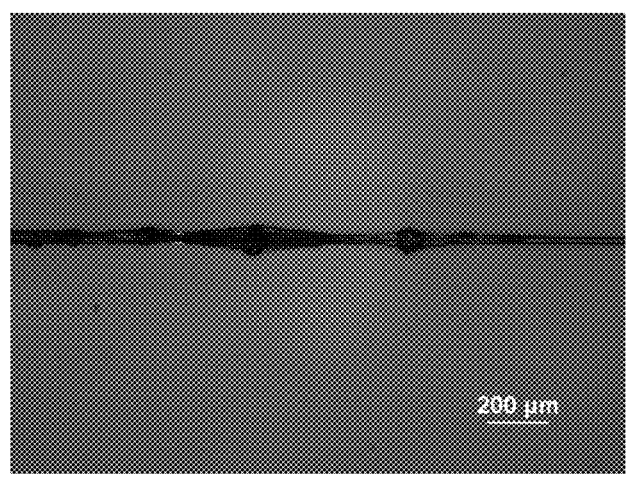
FIG. 4 is an optical microscope photograph of the spider silk-like polymer fiber prepared in Example B3.
Figure 5:
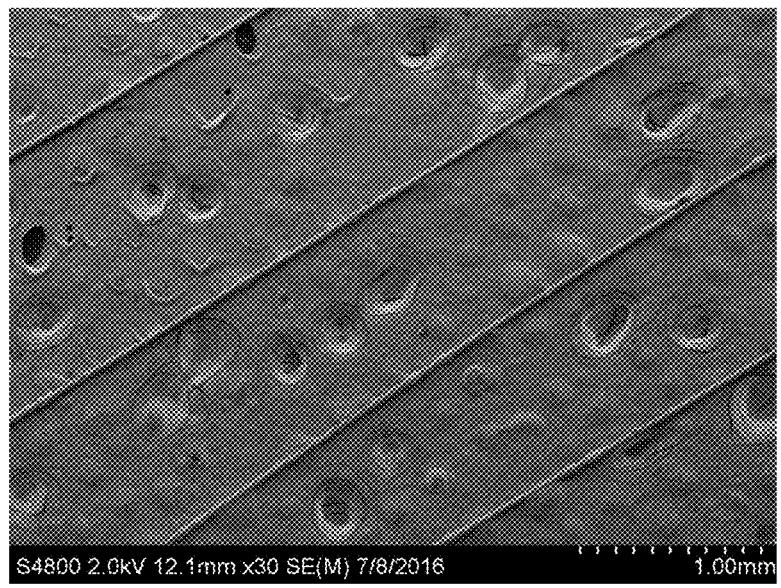
FIG. 5 is a scanning electron microscope photograph of the spider silk-like polymer fibers prepared in Example A1.
Figure 6:
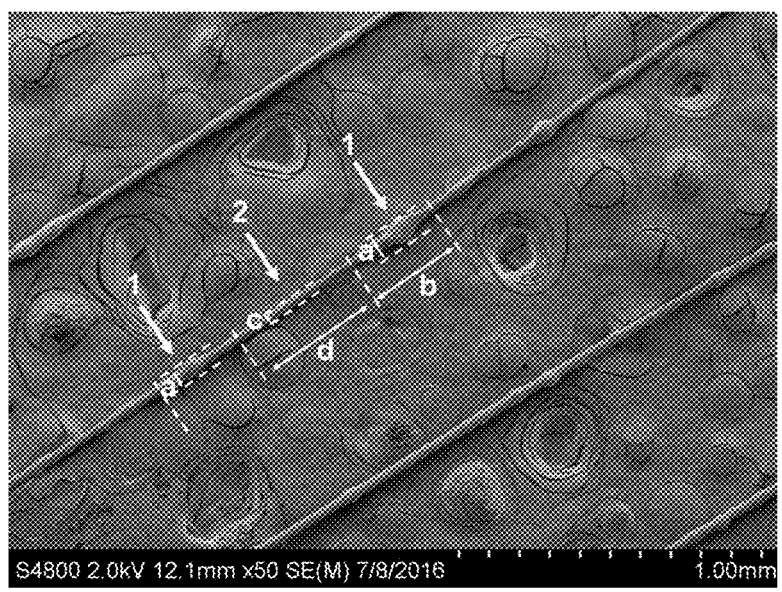
FIG. 6 is a scanning electron microscope photograph of the spider silk-like polymer fibers prepared in Example A2.
Figure 7:
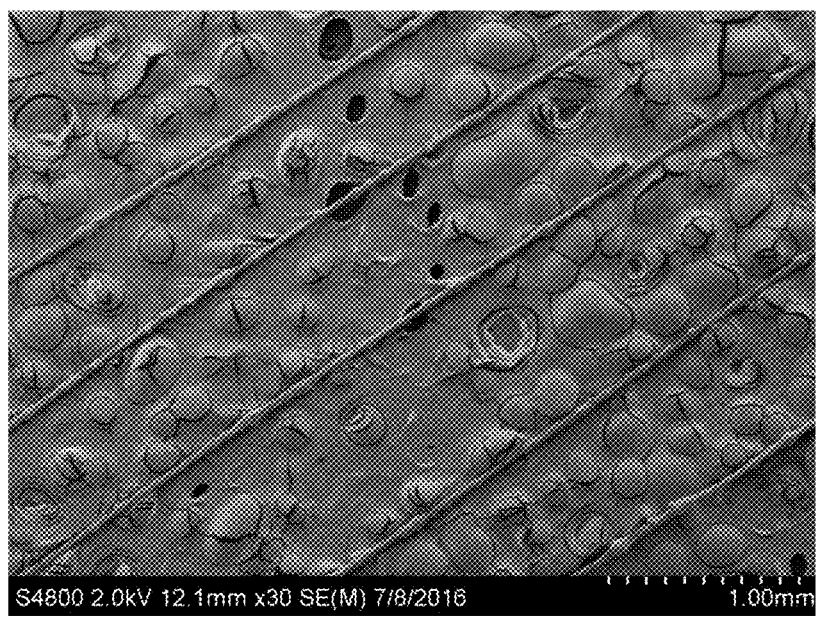
FIG. 7 is a scanning electron microscope photograph of the spider silk-like polymer fibers prepared in Example A3.
Figure 8:
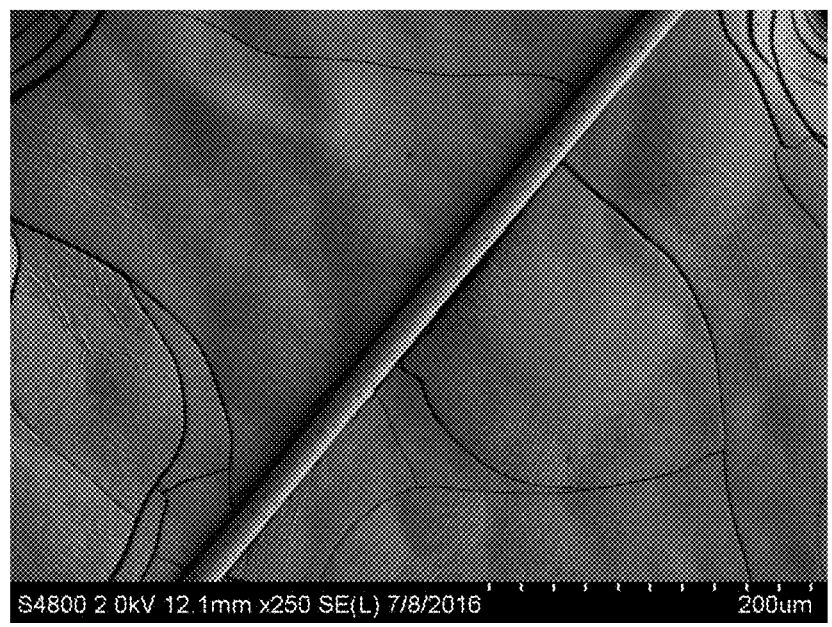
FIG. 8 is a scanning electron microscope photograph of the pure polyvinyl alcohol fiber prepared in Comparative Example A1.

7 g of polyvinyl alcohol (PVA 1799, Aladdin, polymerization degree of 1700, alcoholysis degree of 99%) and 2.1 g of carboxylated styrene-butadiene spray-dried powder rubber (the same as that in Example A1) were dispersed in 43 g of 1,4-dioxane (DMSO), and stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.01 ml/min, the model of the spinneret was 25G (circular, the diameter of 260 microns), the taking-up rate was 0.42 m/min, and the fiber was in the coagulation bath for at least 5 minutes. The obtained fiber was thoroughly dried in the air and then was collected to produce a spider silk-like polymer fiber having the water collecting characteristic. The fiber was tested, and the test results are shown in FIG. 7. As for the obtained fiber, the fiber body had a diameter of 30 microns, the spindle knot structural units had a radial height of 40-100 microns, and an axial length of 50-200 microns, and the spacing of the spindle knots was 50-1200 microns. The fiber was tested for its mechanical properties, and its tensile strength at break was 36±6 MPa.

Example A4

7 g of polyvinyl alcohol (PVA 1799, Aladdin, polymerization degree of 1700, alcoholysis degree of 99%) and 0.7 g of carboxylated styrene-butadiene spray-dried powder rubber (the same as that in Example A1) were dispersed in 43 g of 1,4-dioxane (DMSO), and stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.01 ml/min, the model of the spinneret was 25G (circular, the diameter of 260 microns), the taking-up rate was 0.42 m/min, and the fiber was in the coagulation bath for at least 5 minutes. The above obtained fiber was placed in a crosslinking solution (11.48 g of 98% concentrated sulfuric acid, 3.5 g of sodium sulfate, 4.16 g of 50% glutaraldehyde aqueous solution, formulated into a constant volume of 50 ml of an aqueous solution) for 5 minutes, and after being washed with water, dried and collected, a spider silk-like polymer fiber having the water collecting characteristic was obtained. As for the obtained fiber, the fiber body had a diameter of 30 microns, the spindle knot structural units had a radial height of 40-100 microns and an axial length of 50-200 microns, and the spacing of the spindle knots was 70-3000 microns.

Example A5

7 g of polyvinyl alcohol (PVA 1799, Aladdin, polymerization degree of 1700, alcoholysis degree of 99%) and 1.4 g of carboxylated styrene-butadiene spray-dried powder rubber (the same as that in Example A1) were dispersed in 43 g of 1,4-dioxane (DMSO), and stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.01 ml/min, the model of the spinneret was 25G (circular, the diameter of 260 microns), the taking-up rate was 0.42 m/min, and the fiber was in the coagulation bath for at least 5 minutes. The above obtained fiber was placed in a crosslinking solution (11.48 g of 98% concentrated sulfuric acid, 3.5 g of sodium sulfate, 4.16 g of 50% glutaraldehyde aqueous solution, were formulated into a constant volume of 50 ml of an aqueous solution) for 5 minutes, and after being washed with water, dried and collected, a spider silk-like polymer fiber having the water collecting characteristic was obtained. As for the obtained fiber, the fiber body had a diameter of 30 microns, the spindle knot structural units had a radial height of 40-100 microns, and an axial length of 50-200 microns, and the spacing of the spindle knots was 50-2200 microns.

Example A6

7 g of polyvinyl alcohol (PVA 1799, Aladdin, polymerization degree of 1700, alcoholysis degree of 99%) and 2.1 g of carboxylated styrene-butadiene spray-dried powder rubber (the same as that in Example A1) were dispersed in 43 g of 1,4-dioxane (DMSO), and stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the extrusion rate was 0.01 ml/min, the model of the spinneret was 25G (circular, the diameter of 260 microns), the taking-up rate was 0.42 m/min, and the fiber was in the coagulation bath for at least 5 minutes. The above obtained fiber was placed in a crosslinking solution (11.48 g of 98% concentrated sulfuric acid, 3.5 g of sodium sulfate, 4.16 g of 50% glutaraldehyde aqueous solution, formulated into a constant volume of 50 ml of an aqueous solution) for 5 minutes, and after being washed with water, dried and collected, a spider silk-like polymer fiber having the water collecting characteristic was obtained. The fiber was tested, and the test results were shown in FIG. 9. As for the obtained fiber, the fiber body had a diameter of 30 microns, the spindle knot structural units had a radial height of 40-100 microns, and an axial length of 50-200 microns, and the spacing of the spindle knots was 50-1200 microns.

Example A7

10 g of polyvinyl alcohol (PVA 1799, Aladdin, polymerization degree of 1700, alcoholysis degree of 99%) and 1 g of carboxylated styrene-butadiene spray-dried powder rubber (the same as that in Example A1) were dispersed in 25 g of 1,4-dioxane (DMSO), and stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.01 ml/min, the model of the spinneret was 25G (circular, the diameter of 260 microns), the taking-up rate was 0.42 m/min, and the fiber was in the coagulation bath for at least 5 minutes. The obtained fiber was thoroughly dried in the air and then was collected to produce a spider silk-like polymer fiber having the water collecting characteristic. As for the obtained fiber, the fiber body had a diameter of 40 microns, the spindle knot structural units had a radial height of 50-100 microns and an axial length of 70-250 microns, and the spacing of the spindle knots was 50-2800 microns.

Example A8

10 g of polyvinyl alcohol (PVA 1799, Aladdin, polymerization degree of 1700, alcoholysis degree of 99%) and 1 g of carboxylated styrene-butadiene spray-dried powder rubber (the preparation process was same as that in Example A1 except that the carboxylated styrene-butadiene spray-dried powder rubber sample having an average particle size of 40 microns after sieving was selected) were dispersed in 40 g of 1,4-dioxane (DMSO), and stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.01 ml/min, the model of the spinneret was 25G (circular, the diameter of 260 microns), the taking-up rate was 0.42 m/min, and the fiber was in the coagulation bath for at least 5 minutes. The obtained fiber was thoroughly dried in the air and then was collected to produce a spider silk-like polymer fiber having the water collecting characteristic. As for the obtained fiber, the fiber body had a diameter of 34 microns, the spindle knot structural units had a radial height of 45-100 microns, and an axial length of 50-200 microns, and the spacing of the spindle knots was 50-3000 microns.

Example A9

10 g of polyvinyl alcohol (PVA 1788, Aladdin, polymerization degree of 1700, alcoholysis degree of 88%) and 1 g of carboxylated styrene-butadiene spray-dried powder rubber (the same as that in Example A1) were dispersed in 40 g of 1,4-dioxane (DMSO), and stirred and heated at 70° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.01 ml/min, the model of the spinneret was 25G (circular, the diameter of 260 microns), the taking-up rate was 0.40 m/min, and the fiber was in the coagulation bath for at least 5 minutes. The obtained fiber was thoroughly dried in the air and then was collected to produce a spider silk-like polymer fiber having the water collecting characteristic. As for the obtained fiber, the fiber body had a diameter of 40 microns, the spindle knot structural units had a radial height of 45-100 microns and an axial length of 50-200 microns, and the spacing of the spindle knots was 60-3000 microns.

Example A10

10 g of polyvinyl alcohol (PVA CP1000, commercially available from KURARAY CO., LTD., polymerization degree of about 400, alcoholysis degree of about 70%) and 1 g of carboxylated styrene-butadiene spray-dried powder rubber (the same as that in Example A8) were dispersed in 40 g of 1,4-dioxane (DMSO), and stirred and heated at 60° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.01 ml/min, the model of the spinneret was 25G (circular, the diameter of 260 microns), the taking-up rate was 0.30 m/min, and the fiber was in the coagulation bath for at least 5 minutes. The obtained fiber was thoroughly dried in the air and then was collected to produce a spider silk-like polymer fiber having the water collecting characteristic. As for the obtained fiber, the body had a diameter of 40 microns, the spindle knot structural units had a radial height of 45-100 microns and an axial length of 50-250 microns, and the spacing of the spindle knots was 80 to 3500 microns.

Example A11

7 g of polyvinyl alcohol (PVA 1799, Aladdin, polymerization degree of 1700, alcoholysis degree of 99%) and 0.7 g of butadiene nitrile spray-dried powder rubber were dispersed in 43 g of 1,4-dioxane (DMSO), and stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.01 ml/min, the model of the spinneret was 25G (circular, the diameter of 260 microns), the taking-up rate was 0.42 m/min, and the fiber was in the coagulation bath for at least 5 minutes. The obtained fiber was thoroughly dried in the air and then was collected to produce a spider silk-like polymer fiber having the water collecting characteristic. As for the obtained fiber, the fiber body had a diameter of 30 microns, the spindle knot structural units had a radial height of 60-130 microns, and an axial length of 70-300 microns, and the spacing of the spindle knots was 50-3000 microns.

The above butadiene nitrile spray-dried powder rubber was prepared according to the following process: 1 kg of a nitrile butadiene rubber latex (produced by Lanzhou Petrochemical) with a solid content of 45% was charged into a container and dropwise added with 15 g of trimethylolpropane triacrylate under stirring, and after completion of dropwise addition, stirring was continued for one hour and then irradiated by a cobalt source at a dose of 2.5 Mrad and a dose rate of 50 Gy/min. The irradiated latex was spray-dried by a spray dryer, with the inlet temperature of the spray dryer of 140-160° C. and the outlet temperature of the spray dryer of 60-70° C. The dried butadiene nitrile rubber powder was collected and sieved to produce the butadiene nitrile spray-dried powder rubber sample having an average particle size of 60 microns for use in this example.

Example A12

7 g of polyvinyl alcohol (PVA 1799, Aladdin, polymerization degree of 1700, alcoholysis degree of 99%) and 0.7 g of butadiene nitrile spray-dried powder rubber (the preparation process is the same as that in Example A11 except that the butadiene nitrile spray-dried powder rubber sample having an average particle size of 15 microns after volume sieving was selected) were dispersed in 43 g of 1,4-dioxane (DMSO), and stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.006 ml/min, the model of the spinneret was 30G (circular, the diameter of 160 microns), the taking-up rate was 0.6 m/min, and the fiber was in the coagulation bath for at least 5 minutes. The obtained fiber was thoroughly dried in the air and then was collected to produce a spider silk-like polymer fiber having the water collecting characteristic. As for the obtained fiber, the fiber body had a diameter of 15 microns, the spindle knot structural units had a radial height of 20-50 microns and an axial length of 20-150 microns, and the spacing of the spindle knots was 120-3700 microns.

Example A13

7 g of polyvinyl alcohol (PVA 1799, Aladdin, polymerization degree of 1700, alcoholysis degree of 99%) and 0.7 g of butadiene nitrile spray-dried powder rubber (the preparation process is the same as that in Example A11 except that the butadiene nitrile spray-dried powder rubber sample having an average particle size of 90 microns after volume sieving was selected) were dispersed in 43 g of 1,4-dioxane (DMSO), and stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.01 ml/min, the model of the spinneret was 22G (circular, the diameter of 410 microns), the taking-up rate was 0.15 m/min, and the fiber was in the coagulation bath for at least 5 minutes. The obtained fiber was thoroughly dried in the air and then was collected to produce a spider silk-like polymer fiber having the water collecting characteristic. As for the obtained fiber, the body had a diameter of 50 microns, the spindle knot structural units had a radial height of 80-150 microns and an axial length of 80-400 microns, and the spacing of the spindle knots was 150-3200 microns.

Example A14

8 g of polyvinyl alcohol (PVA 1799, Aladdin, polymerization degree of 1700, alcoholysis degree of 99%) and 0.7 g of butadiene nitrile spray-dried powder rubber (the preparation process is the same as that in Example A11 except that the butadiene nitrile spray-dried powder rubber sample having an average particle size of 30 microns after volume sieving was selected) were dispersed in 42 g of water, and stirred and heated at 80° C. for 2 hours to obtain a uniform spinning dope. At room temperature, the above spinning dope was extruded into a coagulation bath (a sodium sulfate aqueous solution, 420 g/L) via a peristaltic pump for spinning: the actual extrusion rate was 0.01 ml/min, the model of the spinneret was 25G (circular, the diameter of 260 microns), the taking-up rate was 0.42 m/min, and the fiber was in the coagulation bath for at least 5 minutes. The obtained fiber was thoroughly dried in the air and then was collected to produce a spider silk-like polymer fiber having the water collecting characteristic. As for the obtained fiber, the fiber body had a diameter of 28 microns, the spindle knot structural units had a radial height of 30-80 microns and an axial length of 30-200 microns, and the spacing of the spindle knots was 60-2500 microns.

Example A15

8 g of polyvinyl alcohol (PVA 1799, Aladdin, polymerization degree of 1700, alcoholysis degree of 99%) and 0.7 g of butadiene nitrile spray-dried powder rubber (the same as that in Example A12) were dispersed in 42 g of water, and stirred and heated at 85° C. for 2 hours to obtain a uniform spinning dope. At room temperature, the above spinning dope was extruded into a coagulation bath (a sodium sulfate aqueous solution, 420 g/L) via a peristaltic pump for spinning: the actual extrusion rate was 0.01 ml/min, the model of the spinneret was 25G (circular, the diameter of 260 microns), the taking-up rate was 0.6 m/min, and the fiber was in the coagulation bath for at least 5 minutes. The obtained fiber was thoroughly dried in the air and then was collected to produce a spider silk-like polymer fiber having the water collecting characteristic. As for the obtained fiber, the fiber body had a diameter of 22 microns, the spindle knot structural units had a radial height of 30-80 microns, and an axial length of 30-200 microns, and the spacing of the spindle knots was 120-4000 microns.

Example A16

8 g of polyvinyl alcohol (PVA 1799, Aladdin, polymerization degree of 1700, alcoholysis degree of 99%) and 0.7 g of carboxylated butadiene nitrile spray-dried powder rubber were dispersed in 42 g of water, and stirred and heated at 90° C. for 2 hours to obtain a uniform spinning dope. At room temperature, the above spinning dope was extruded into a coagulation bath (a sodium sulfate aqueous solution, 420 g/L) via a peristaltic pump for spinning: the actual extrusion rate was 0.06 ml/min, the model of the spinneret was 25G (circular, the diameter of 260 microns), the taking-up rate was 0.42 m/min, and the fiber was in the coagulation bath for at least 5 minutes. The obtained fiber was thoroughly dried in the air and then was collected to produce a spider silk-like polymer fiber having the water collecting characteristic. As for the obtained fiber, the fiber body had a diameter of 24 microns, the spindle knot structural units had a radial height of 30-80 microns and an axial length of 30-200 microns, and the spacing of the spindle knots was 160-3200 microns.

The above carboxylated butadiene nitrile spray-dried powder rubber was prepared according to the following process: 1 kg of a carboxylated nitrile butadiene latex (produced by Lanzhou Petrochemical, Brand: XNBRL) with a solid content of 45% was charged into a container and dropwise added with 13.5 g of isooctyl acrylate under stirring, and after completion of dropwise addition, stirring was continued for one hour and then irradiated by a cobalt source at a dose of 2.5 Mrad and a dose rate of 50 Gy/min. The irradiated latex was spray-dried by a spray dryer, with the inlet temperature of the spray dryer of 140-160° C. and the outlet temperature of the spray dryer of 60-70° C. The dried carboxylated nitrile butadiene rubber powder was collected and sieved to produce the carboxylated butadiene nitrile spray-dried powder rubber sample having an average particle size of 30 microns for use in this example.

Example A17

10 g of polyacrylonitrile (commercially available from Sigma-Aldrich (Shanghai) Trading Co., Ltd., having a weight average molecular weight of 150000) and 1 g of carboxylated styrene-butadiene spray-dried powder rubber (the same as that in Example A1) were dispersed in 40 g of N,N-dimethylformamide (DMF), and stirred and heated at 50° C. for 2 hours to obtain a uniform spinning dope. At room temperature, the above spinning dope was extruded into a coagulation bath (a mixed solution of water and DMF with 50 weight parts of DMF based on 100 weight parts of water) via a peristaltic pump for spinning: the actual extrusion rate was 0.01 ml/min, the model of the spinneret was 25G (circular, the diameter of 260 microns), the taking-up rate was 0.42 m/min, and the fiber was in the coagulation bath for at least 5 minutes. The obtained fiber was thoroughly dried in the air and then was collected to produce a spider silk-like polymer fiber having the water collecting characteristic. As for the obtained fiber, the fiber body had a diameter of 35 microns, the spindle knot structural units had a radial height of 40-100 microns and an axial length of 50-200 microns, and the spacing of the spindle knots was 90-3100 microns.

Example A18

10 g of poly(p-phenylene terephthamide) (having a weight average molecular weight of 60000) and 1 g of carboxylated styrene-butadiene spray-dried powder rubber (the same as that in Example A8) were dispersed in 40 g of 98% sulfuric acid, and stirred and heated at 80° C. for 2 hours to obtain a uniform spinning dope. At room temperature, the above spinning dope was extruded into a coagulation bath (water) via a peristaltic pump for spinning: the actual extrusion rate was 0.01 ml/min, the model of the spinneret was 27G (circular, the diameter of 210 microns), the taking-up rate was 1 m/min, and the fiber was in the coagulation bath for at least 5 minutes. The obtained fiber was thoroughly dried in the air and then was collected to produce a spider silk-like polymer fiber having the water collecting characteristic. As for the obtained fiber, the body had a diameter of 25 microns, the spindle knot structural units had a radial height of 40-100 microns, and an axial length of 50-200 microns, and the spacing of the spindle knots was 200-4500 microns.

Example A19

10 g of polyurethane (commercially available from Shandong Dongchen Engineering Plastics Co., Ltd. Brand: WANTHANE® WHT-8170) and 1 g of spray-dried powder natural rubber were dispersed in 30 g of N,N-dimethylformamide (DMF), stirred and heated at 80° C. for 2 hours to obtain a uniform spinning dope. At room temperature, the above spinning dope was extruded into a coagulation bath (a mixed solution of water and DMF with 40 weight parts of DMF based on 100 weight parts of water) via a peristaltic pump for spinning: the actual extrusion rate was 0.01 ml/min, the model of the spinneret was 28G (circular, the diameter of 180 microns), the taking-up rate was 1 m/min, and the fiber was in the coagulation bath for at least 5 minutes. The obtained fiber was thoroughly dried in the air and then was collected to produce a spider silk-like polymer fiber having the water collecting characteristic. As for the obtained fiber, the fiber body had a diameter of 27 microns, the spindle knot structural units had a radial height of 45-120 microns and an axial length of 50-220 microns, and the space between the spindle knots of 180-3600 microns.

The above spray-dried natural rubber powder was prepared according to the following process: 1 kg of a natural rubber latex (provided by Beijing Latex Factory) with a solid content of 60% was charged into a container and dropwise added with 30 g of trimethylolpropane triacrylate under stirring, and after completion of dropwise addition, stirring was continued for one hour and then irradiated by a cobalt source at a dose of 15 Mrad and a dose rate of 50 Gy/min. The irradiated latex was spray-dried by a spray dryer, with the inlet temperature of the spray dryer of 140-160° C. and the outlet temperature of the spray dryer of 60-70° C. The dried natural rubber powder was collected and sieved to produce the spray-dried natural rubber powder sample having an average particle size of 50 microns for use in this example.

Example 2

7 g of polyvinyl alcohol (PVA 1799, Aladdin, polymerization degree of 1700, alcoholysis degree of 99%) and 2.1 g of silica porous microspheres (the same as that in Example 1) were dispersed in 43 g of 1,4-dioxane (DMSO), stirred and heated at 80° C. for 2 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 8 times the original length, to produce the spider silk-like fiber. As for the obtained fiber, the fiber body had a diameter of 27 microns, the spindle knots had a radial height of 40-75 microns and an axial length of 50-400 microns, and the spacing of the spindle knots was 60-1000 microns. The above fiber was tested for its mechanical properties, and its tensile strength at break was 154±15 MPa.

Example 3

6 g of polyvinyl alcohol (PVA 2499, Aladdin, polymerization degree of 2400, alcoholysis degree of 99%) and 0.9 g of silica porous microspheres (the same as that in Example 1) were dispersed in 44 g of 1,4-dioxane (DMSO), stirred and heated at 80° C. for 3 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 6 times the original length, to produce the spider silk-like fiber. As for the obtained fiber, the body had a diameter of 25 microns, the spindle knots had a radial height of 35-80 microns and an axial length of 50-450 microns, and the spacing of the spindle knots was 70-2000 microns.

Example 4

6 g of polyvinyl alcohol (PVA 2499, Aladdin, polymerization degree of 2400, alcoholysis degree of 99%) and 0.9 g of silica porous microspheres (the same as that in Example 1) were dispersed in 44 g of 1,4-dioxane (DMSO), stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.02 ml/min, the model of the spinneret was 25G (the diameter of 260 microns), the taking-up rate was 0.4 m/min, and the fiber was in the coagulation bath for at least 5 minutes; after thoroughly drying and collecting, a primary fiber was obtained; it was thermally stretched at 180° C. to 12 times the original length, to produce the spider silk-like fiber. As for the obtained fiber, the body had a diameter of 15 microns, the spindle knots had a radial height of 40-70 microns and an axial length of 50-350 microns, and the spacing of the spindle knots was 90-2000 microns.

Example 5

7 g of polyvinyl alcohol (PVA 1799, Aladdin, polymerization degree of 1700, alcoholysis degree of 99%) and 1.05 g of silica porous microspheres (the same as that in Example 1) were dispersed in 43 g of 1,4-dioxane (DMSO), stirred and heated at 70° C. for 4 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; after it was thermally stretched at 180° C. to 8 times the original length, it was placed in a crosslinking solution (11.48 g of 98% concentrated sulfuric acid, 3.5 g of sodium sulfate, 4.16 g of 50% glutaraldehyde aqueous solution, formulated into a constant volume of 50 ml of an aqueous solution) for 10 minutes. After being washed with water, dried and collected, a spider silk-like fiber was obtained. As for the obtained fiber, the body had a diameter of 27 microns, the spindle knots had a radial height of 40-70 microns and an axial length of 50-400 microns, and the spacing of the spindle knots was 70-2000 microns.

Example 6

8 g of polyvinyl alcohol (PVA 1788, Aladdin, polymerization degree of 1700, alcoholysis degree of 88%) and 0.8 g of silica porous microspheres (50 microns, commercially available from Microspheres-nanospheres, the average pore diameter: 10 nm, the porosity: 20-40%) were dispersed in 42 g of 1,4-dioxane (DMSO), stirred and heated at 75° C. for 3 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 8 times the original length, to produce the spider silk-like fiber. As for the obtained fiber, the body had a diameter of 30 microns, the spindle knots had a radial height of 60-80 microns and an axial length of 80-400 microns, and the spacing of the spindle knots was 110-3300 microns.

Example 7

8 g of polyvinyl alcohol (PVA 2499, Aladdin, polymerization degree of 2400, alcoholysis degree of 99%) and 0.8 g of silica porous microspheres (75 microns, commercially available from Microspheres-nanospheres, the average pore diameter: 10 nm, the porosity: 20-40%) were dispersed in 42 g of 1,4-dioxane (DMSO), stirred and heated at 75° C. for 3 hours to obtain a uniform spinning dope. At room temperature, the above spinning dope was extruded into methanol via a peristaltic pump for spinning: the actual extrusion rate was 0.04 ml/min, the model of the spinneret was 22G (the diameter of 410 microns), the taking-up rate was 0.05 m/min, and the fiber was in the coagulation bath for at least 5 minutes; after thoroughly drying and collecting, a primary fiber was obtained; it was thermally stretched at 180° C. to 8 times the original length, to produce the spider silk-like fiber. As for the obtained fiber, the body had a diameter of 50 microns, the spindle knots had a radial height of 80-100 microns and an axial length of 120-500 microns, and the spacing of the spindle knots was 130-3000 microns.

Example 8

7 g of polyvinyl alcohol (PVA 1799, Aladdin, polymerization degree of 1700, alcoholysis degree of 99%) and 1.05 g of silica porous microspheres (50 microns, commercially available from Microspheres-nanospheres, the average pore diameter: 10 nm, the porosity: 20-40%) were dispersed in 43 g of water, and stirred and heated at 75° C. for 3 hours to obtain a uniform spinning dope. At room temperature, the above spinning dope was extruded into a sodium sulfate aqueous solution (420 g/L) via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; after it was thermally stretched at 180° C. to 10 times the original length, it was placed in a crosslinking solution (11.48 g of 98% concentrated sulfuric acid, 3.5 g of sodium sulfate, 4.16 g of 50% glutaraldehyde aqueous solution, formulated into a constant volume of 50 ml of an aqueous solution) for 10 minutes. After being washed with water, dried and collected, a spider silk-like polymer fiber was obtained. As for the obtained fiber, the body had a diameter of 28 microns, the spindle knots had a radial height of 60-90 microns and an axial length of 120-460 microns, and the spacing of the spindle knots was 130-3700 microns.

Example 9

10 g of polyacrylonitrile (commercially available from Sigma-Aldrich (Shanghai) Trading Co., Ltd., having a weight average molecular weight of 150000) and 1.5 g of silica porous microspheres (the same as that in Example 1) were dispersed in 40 g of N,N-dimethylformamide (DMF), and stirred and heated at 60° C. for 3 hours to obtain a uniform spinning dope. At room temperature, the above spinning dope was extruded into a coagulation bath (a mixed solution of water and DMF with 50 weight parts of the DMF based on 100 weight parts of water) via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 95° C. to 8 times the original length, to produce the spider silk-like fiber. As for the obtained fiber, the body had a diameter of 25 microns, the spindle knots had a radial height of 40-80 microns and an axial length of 80-380 microns, and the spacing of the spindle knots was 90-2600 microns.

Example 10

7 g of polyvinyl alcohol (PVA 1799, Aladdin, polymerization degree of 1700, alcoholysis degree of 99%) and 0.35 g of silica porous microspheres (the same as that in Example 1) were dispersed in 43 g of 1,4-Dioxane (DMSO), stirred and heated at 80° C. for 2 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fibers were in the coagulation bath for at least 5 minutes; after thoroughly drying and collecting, a primary fiber was obtained; it was thermally stretched at 180° C. to 10 times the original length, to produce the spider silk-like fiber. As for the obtained fiber, the body had a diameter of 24 microns, the spindle knots had a radial height of 37-70 microns and an axial length of 50-350 microns, and the spacing of the spindle knots was 200-4000 microns.

Example 11

7 g of polyvinyl alcohol (PVA 1799, Aladdin, polymerization degree of 1700, alcoholysis degree of 99%) and 2.8 g of silica porous microspheres (the same as that in Example 1) were dispersed in 43 g of 1,4-dioxane (DMSO), stirred and heated at 80° C. for 2 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 6 times the original length, to produce the spider silk-like fiber. As for the obtained fiber, the body had a diameter of 24 microns, the spindle knots had a radial height of 45-90 microns and an axial length of 70-550 microns, and the spacing of the spindle knots was 70-800 microns.

Example 12

10 g of polyurethane (commercially available from Shandong Dongchen Engineering Plastics Co., Ltd. Brand: WANTHANE® WHT-8170) and 1.5 g of silica porous microspheres (the same as that in Example 1) were dispersed in 30 g of N,N-dimethylformamide (DMF), stirred and heated at 80° C. for 2 hours to obtain a uniform spinning dope. At room temperature, the above spinning dope was extruded into a coagulation bath (a mixed solution of water and DMF with 40 weight parts of DMF based on 100 weight parts of water) via a peristaltic pump for spinning: the actual extrusion rate was 0.01 ml/min, the model of the spinneret was 25G (the diameter of 260 microns), the taking-up rate was 0.4 m/min, and the fiber was in the coagulation bath for at least 5 minutes; after thoroughly drying and collecting, a primary fiber was obtained; it was stretched to 10 times the original length, to produce a spider silk-like polymer fiber. As for the obtained fiber, the body had a diameter of 26 microns, the spindle knots had a radial height of 35-77 microns and an axial length of 60-400 microns, and the spacing of the spindle knots was 220-2600 microns.

Example B1

7 g of polyvinyl alcohol (PVA 1799, Aladdin, polymerization degree of 1700, alcoholysis degree of 99%) and 1.05 g of silica gel for column chromatography (commercially available from Qingdao JIYIDA Silica Gel Reagent Co., Ltd., 200-300 meshes, the pore diameter: 20-30 Å, the porosity: 40-60%) were dispersed in 43 g of 1,4-dioxane (DMSO), stirred and heated at 80° C. for 2 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 8 times the original length, to produce the spider silk-like fiber. The fiber was tested, and the test results were shown in FIG. 2 and FIG. 3. As for the obtained fiber, the body had a diameter of 26 microns, the spindle knots had a radial height of 55-120 microns and an axial length of 100-500 microns, and the spacing of the spindle knots was 80-2000 microns.

Example B2

7 g of polyvinyl alcohol (PVA 1799, Aladdin, polymerization degree of 1700, alcoholysis degree of 99%) and 1.4 g of silica gel for column chromatography (commercially available from Qingdao JIYIDA Silica Gel Reagent Co., Ltd., 200-300 meshes, the pore diameter: 20-30 Å, the porosity: 40-60%) were dispersed in 43 g of 1,4-dioxane (DMSO), stirred and heated at 80° C. for 2 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 8 times the original length, to produce the spider silk-like fiber. As for the obtained fiber, the body had a diameter of 25 microns, the spindle knots had a radial height of 60-130 microns and an axial length of 90-500 microns, and the spacing of the spindle knots was 70-1500 microns. The fiber was tested for its mechanical properties, and its tensile strength at break was 300±34 MPa.

Example B3

7 g of polyvinyl alcohol (PVA 1799, Aladdin, polymerization degree of 1700, alcoholysis degree of 99%) and 2.1 g of silica gel for column chromatography (commercially available from Qingdao JIYIDA Silica Gel Reagent Co., Ltd., 200-300 meshes, the pore diameter: 20-30 Å, the porosity: 40-60%) were dispersed in 43 g of 1,4-dioxane (DMSO), stirred and heated at 70° C. for 2 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 8 times the original length, to produce the spider silk-like fiber. The fiber was tested, and the test results were shown in FIG. 4. As for the obtained fiber, the body had a diameter of 26 microns, the spindle knots had a radial height of 60-120 microns and an axial length of 100-520 microns, and the spacing of the spindle knots was 70-1000 microns. The fiber was tested for its mechanical properties, and its tensile strength at break was 185±20 MPa.

Example B4

8 g of polyvinyl alcohol (PVA 2499, Aladdin, polymerization degree of 2400, alcoholysis degree of 99%) and 0.8 g of silica gel for column chromatography (commercially available from Qingdao JIYIDA Silica Gel Reagent Co., Ltd., 200-300 meshes, the pore diameter: 40-70 Å, the porosity: 40-60%) were dispersed in 42 g of 1,4-dioxane (DMSO), stirred and heated at 95° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.02 ml/min, the model of the spinneret was 22G (the diameter of 410 microns), the taking-up rate was 0.4 m/min, and the fiber was in the coagulation bath for at least 5 minutes; after thoroughly drying and collecting, a primary fiber was obtained; after it was thermally stretched at 180° C. to 10 times the original length, it was placed in a crosslinking solution (11.48 g of 98% concentrated sulfuric acid, 3.5 g of sodium sulfate, 4.16 g of 50% glutaraldehyde aqueous solution, formulated into a constant volume of 50 ml of an aqueous solution) for 10 minutes. After being washed with water, dried and collected, a spider silk-like fiber was obtained. As for the obtained fiber, the body had a diameter of 17 microns, the spindle knots had a radial height of 55-90 microns and an axial length of 80-350 microns, and the spacing of the spindle knots was 100-2500 microns.

Example B5

7 g of polyvinyl alcohol (PVA 1788, Aladdin, polymerization degree of 1700, alcoholysis degree of 88%) and 1.05 g of silica gel for column chromatography (commercially available from Qingdao JIYIDA Silica Gel Reagent Co., Ltd., 300-400 meshes, the pore diameter: 20-30 Å, the porosity: 40-60%) were dispersed in 43 g of 1,4-dioxane (DMSO), stirred and heated at 75° C. for 2 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; after it was thermally stretched at 180° C. to 8 times the original length, it was placed in a crosslinking solution (11.48 g of 98% concentrated sulfuric acid, 3.5 g of sodium sulfate, 4.16 g of 50% glutaraldehyde aqueous solution, formulated into a constant volume of 50 ml of an aqueous solution) for 10 minutes. After being washed with water, dried and collected, a spider silk-like fiber was obtained. As for the obtained fiber, the body had a diameter of 27 microns, the spindle knots had a radial height of 40-80 microns and an axial length of 80-350 microns, and the spacing of the spindle knots was 100-2500 microns.

Example B6

7 g of polyvinyl alcohol (PVA 1788, Aladdin, polymerization degree of 1700, alcoholysis degree of 88%) and 1.75 g of silica gel for column chromatography (commercially available from Qingdao JIYIDA Silica Gel Reagent Co., Ltd., 300-400 meshes, the pore diameter: 40-70 Å, the porosity: 40-60%) were dispersed in 43 g of 1,4-dioxane (DMSO), stirred and heated at 85° C. for 3 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 8 times the original length, to produce the spider silk-like fiber. As for the obtained fiber, the body had a diameter of 27 microns, the spindle knots had a radial height of 40-80 microns and an axial length of 90-370 microns, and the spacing of the spindle knots was 100-1500 microns.

Example B7

8 g of polyvinyl alcohol (PVA 2499, Aladdin, polymerization degree of 2400, alcoholysis degree of 99%) and 0.8 g of silica gel for column chromatography (commercially available from Qingdao JIYIDA Silica Gel Reagent Co., Ltd., 100-200 meshes, the pore diameter: 80-100 Å, the porosity: 40-60%) were dispersed in 42 g of 1,4-dioxane (DMSO), stirred and heated at 90° C. for 4 hours to obtain a uniform spinning dope. At room temperature, the above spinning dope was extruded into methanol via a peristaltic pump for spinning: the actual extrusion rate was 0.02 ml/min, the model of the spinneret was 22G (the diameter of 410 microns), the taking-up rate was 0.1 m/min, and the fiber was in the coagulation bath for at least 5 minutes; after thoroughly drying and collecting, a primary fiber was obtained; it was thermally stretched at 180° C. to 8 times the original length, to produce the spider silk-like fiber. As for the obtained fiber, the body had a diameter of 52 microns, the spindle knots had a radial height of 80-180 microns and an axial length of 170-500 microns, and the spacing of the spindle knots was 110-3000 microns.

Example B8

8 g of polyvinyl alcohol (PVA 2499, Aladdin, polymerization degree of 2400, alcoholysis degree of 99%) and 1.6 g of silica gel for column chromatography (commercially available from Qingdao JIYIDA Silica Gel Reagent Co., Ltd., 100-200 meshes, the pore diameter: 80-100 Å, the porosity: 40-60%) were dispersed in 42 g of 1,4-dioxane (DMSO), stirred and heated at 90° C. for 4 hours to obtain a uniform spinning dope. At room temperature, the above spinning dope was extruded into methanol via a peristaltic pump for spinning: the actual extrusion rate was 0.02 ml/min, the model of the spinneret was 22G (the diameter of 410 microns), the taking-up rate was 0.1 m/min, and the fiber was in the coagulation bath for at least 5 minutes; after thoroughly drying and collecting, a primary fiber was obtained; it was thermally stretched at 180° C. to 8 times the original length, to produce the spider silk-like fiber. As for the obtained fiber, the body had a diameter of 53 microns, the spindle knots had a radial height of 80-185 microns and an axial length of 165-510 microns, and the spacing of the spindle knots was 105-1800 microns.

Example B9

7 g of polyvinyl alcohol (PVA 1799, Aladdin, polymerization degree of 1700, alcoholysis degree of 99%) and 0.7 g of silica gel for column chromatography (commercially available from Qingdao JIYIDA Silica Gel Reagent Co., Ltd., 200-300 meshes, the pore diameter: 20-30 Å, the porosity: 40-60%) were dispersed in 43 g of water, stirred and heated at 80° C. for 2 hours to obtain a uniform spinning dope. At room temperature, the above spinning dope was extruded into a sodium sulfate aqueous solution (420 g/L) via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 165° C. to 8 times the original length, to produce the spider silk-like fiber. As for the obtained fiber, the body had a diameter of 30 microns, the spindle knots had a radial height of 60-120 microns and an axial length of 90-400 microns, and the spacing of the spindle knots was 150-4000 microns.

Example B10

7 g of polyvinyl alcohol (PVA 1799, Aladdin, polymerization degree of 1700, alcoholysis degree of 99%) and 1.4 g of silica gel for column chromatography (commercially available from Qingdao JIYIDA Silica Gel Reagent Co., Ltd., 300-400 meshes, the pore diameter: 20-30 Å, the porosity: 40-60%) were dispersed in 43 g of water, stirred and heated at 80° C. for 2 hours to obtain a uniform spinning dope. At room temperature, the above spinning dope was extruded into a sodium sulfate aqueous solution (420 g/L) via a peristaltic pump for spinning: the actual extrusion rate was 0.02 ml/min, the model of the spinneret was 25G (the diameter of 260 microns), the taking-up rate was 0.4 m/min, and the fiber was in the coagulation bath for at least 5 minutes; after thoroughly drying and collecting, a primary fiber was obtained; it was thermally stretched at 165° C. to 6 times the original length, to produce the spider silk-like fiber. As for the obtained fiber, the body had a diameter of 18 microns, the spindle knots had a radial height of 40-80 microns and an axial length of 70-350 microns, and the spacing of the spindle knots was 120-2500 microns.

Example B11

10 g of polyacrylonitrile (commercially available from Sigma-Aldrich (Shanghai) Trading Co., Ltd., having a weight average molecular weight of 150000) and 1.5 g of silica gel for column chromatography (commercially available from Qingdao JIYIDA Silica Gel Reagent Co., Ltd., 200-300 meshes, the pore diameter: 40-70 Å, the porosity: 40-60%) were dispersed in 40 g of N,N-dimethylformamide (DMF), and stirred and heated at 50° C. for 3 hours to obtain a uniform spinning dope. At room temperature, the above spinning dope was extruded into a coagulation bath (a mixed solution of water and DMF with 80 weight parts of the DMF based on 100 weight parts of water) via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 95° C. to 8 times the original length, to produce a spider silk-like fiber. As for the obtained fiber, the body had a diameter of 25 microns, the spindle knots had a radial height of 55-100 microns and an axial length of 100-450 microns, and the spacing of the spindle knots was 70-2500 microns.

Example B12

8 g of polyvinyl alcohol (PVA 1788, Aladdin, polymerization degree of 1700, alcoholysis degree of 88%) and 0.8 g of column chromatography silica gel (commercially available from Qingdao JIYIDA Silica Gel Reagent Co., Ltd., 300-400 meshes, the pore diameter: 20-30 Å, the porosity: 40-60%) were dispersed in 42 g of 1,4-dioxane (DMSO), stirred and heated at 75° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.02 ml/min, the model of the spinneret was 25G (the diameter of 260 microns), the taking-up rate was 0.4 m/min, and the fiber was in the coagulation bath for at least 5 minutes; after thoroughly drying and collecting, a primary fiber was obtained; after it was thermally stretched at 170° C. to 10 times the original length, it was placed in a crosslinking solution (11.48 g of 98% concentrated sulfuric acid, 3.5 g of sodium sulfate, 4.16 g of 50% glutaraldehyde aqueous solution, formulated into a constant volume of 50 ml of an aqueous solution) for 10 minutes. After being washed with water, dried and collected, a spider silk-like fiber was obtained. As for the obtained fiber, the body had a diameter of 20 microns, the spindle knots had a radial height of 38-80 microns and an axial length of 100-300 microns, and the spacing of the spindle knots was 100-3000 microns.

Example B13

7 g of polyvinyl alcohol (PVA 1799, Aladdin, polymerization degree of 1700, alcoholysis degree of 99%) and 0.35 g of silica gel for column chromatography (commercially available from Qingdao JIYIDA Silica Gel Reagent Co., Ltd., 200-300 meshes, the pore diameter: 20-30 Å, the porosity: 40-60%) were dispersed in 43 g of 1,4-dioxane (DMSO), stirred and heated at 80° C. for 2 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 8 times the original length, to produce the spider silk-like fiber. As for the obtained fiber, the body had a diameter of 27 microns, the spindle knots had a radial height of 52-110 microns and an axial length of 80-430 microns, and the spacing of the spindle knots was 100-3800 microns.

Example B14

7 g of polyvinyl alcohol (PVA 1799, Aladdin, polymerization degree of 1700, alcoholysis degree of 99%) and 2.8 g of silica gel for column chromatography (commercially available from Qingdao JIYIDA Silica Gel Reagent Co., Ltd., 300-400 meshes, the pore diameter: 40-70 Å, the porosity: 40-60%) were dispersed in 43 g of 1,4-dioxane (DMSO), stirred and heated at 80° C. for 2 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 8 times the original length, to produce the spider silk-like fiber. As for the obtained fiber, the body had a diameter of 25 microns, the spindle knots had a radial height of 42-90 microns and an axial length of 80-630 microns, and the spacing of the spindle knots was 80-900 microns.

Example B15

5 g of polyurethane (commercially available from Shandong Dongchen Engineering Plastics Co., Ltd. Brand: WANTHANE® WHT-8170) and 1 g of silica gel for column chromatography (commercially available from Qingdao JIYIDA Silica Gel Reagent Co., Ltd., 300-400 meshes, the pore diameter: 40-70 Å, the porosity: 40-60%) were dispersed in 15 g of N,N-dimethylformamide (DMF), stirred and heated at 80° C. for 2 hours to obtain a uniform spinning dope. At room temperature, the above spinning dope was extruded into a coagulation solution (a mixed solution of water and DMF with 40 weight parts of DMF based on 100 weight parts of water) via a peristaltic pump for spinning: the actual extrusion rate was 0.01 ml/min, the model of the spinneret was 25G (the diameter of 260 microns), the taking-up rate was 0.5 m/min, and the fiber was in the coagulation bath for at least 5 minutes; after thoroughly drying and collecting, a primary fiber was obtained; it was stretched to 8 times the original length, to produce the spider silk-like polymer fiber having the water collecting characteristic. As for the obtained fiber, the body had a diameter of 24 microns, the spindle knots had a radial height of 38-79 microns and an axial length of 78-520 microns, and the spacing of the spindle knots was 150-2300 microns.

Example C1

6 g of polyvinyl alcohol (PVA 1788, Aladdin, polymerization degree of 1700, alcoholysis degree of 88%) and 0.9 g of carbon porous microspheres were dispersed in 44 g of 1,4-dioxane (DMSO), stirred and heated at 80° C. for 2 hours to obtain a uniform spinning dope. At room temperature, the above spinning dope was extruded into methanol via a peristaltic pump for spinning: the actual extrusion rate was 0.012 ml/min, the model of the spinneret was 30G (the diameter of 180 microns), the taking-up rate was 0.3 m/min, and the fiber was in the coagulation bath for at least 5 minutes; after thoroughly drying and collecting, a primary fiber was obtained; it was thermally stretched at 180° C. to 10 times the original length, to produce the spider silk-like fiber. As for the obtained fiber, the body had a diameter of 15 microns, the spindle knots had a radial height of 20-40 microns and an axial length of 50-200 microns, and the spacing of the spindle knots was 200-2500 microns.

The above carbon porous microspheres are prepared according to the following process: 105 g of irradiation-crosslinked styrene-acrylic latex (produced by Yanshan Petrochemical) with a solid content of 47% was charged into a container and added with 4.95 g of pyrrole and 72 ml of aqueous solution of polyvinylpyrrolidone (6 g) under stirring. After completion of dropwise addition, 48 ml of hexa-hydrated iron chloride (0.03 g) aqueous solution, 240 ml of p-toluene-sulfonic acid (7.02 g) aqueous solution, and 360 ml of hydrogen peroxide (12.54 g) aqueous solution were slowly added and the stirring was continued for 48 hours in an ice-water bath. The mixture was spray-dried by a spray dryer with the inlet temperature of the spray dryer of 140-160° C. and the outlet temperature of the spray dryer of 60-70° C. The dried poly-pyrrole-styrene-acrylic powder rubber was collected and carbonized at 600° C. for 3 hours, and then, it was sieved to produce the carbon porous microsphere sample having a particle size of 5-30 microns, a pore diameter of 5-10 Å and a porosity of 30-40%, for use in this example.

Example C2

6 g of polyvinyl alcohol (PVA 1788, Aladdin, polymerization degree of 1700, alcoholysis degree of 88%) and 0.9 g of polystyrene porous microspheres (IPE-PST30, commercially available from National Engineering Research Center for Biotechnology, the average particle size of 30 microns, the pore diameter of 20-120 nm, and the porosity of 20-50%) were dispersed in 44 g of 1,4-dioxane (DMSO), stirred and heated at 80° C. for 2 hours to obtain a uniform spinning dope. At room temperature, the above spinning dope was extruded into methanol via a peristaltic pump for spinning: the actual extrusion rate was 0.01 ml/min, the model of the spinneret was 30 G (the diameter of 180 microns), the taking-up rate was 0.4 m/min, and the fiber was in the coagulation bath for at least 5 minutes; after thoroughly drying and collecting, a primary fiber was obtained; it was thermally stretched at 180° C. to 12 times the original length, to produce the spider silk-like fiber. As for the obtained fiber, the body had a diameter of 15 microns, the spindle knots had a radial height of 35-50 microns and an axial length of 50-300 microns, and the spacing of the spindle knots was 200-2700 microns.

Example C3

7 g of polyvinyl alcohol (PVA 1799, Aladdin, polymerization degree of 1700, alcoholysis degree of 99%) and 1.05 g of polystyrene porous microspheres (commercially available from Huizhi Biology, the average particle size of 60 microns, the pore diameter of 20-50 nm, and the porosity of 20-30%) were dispersed in 43 g of 1,4-dioxane (DMSO), stirred and heated at 70° C. for 4 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; after it was thermally stretched at 180° C. to 8 times the original length, it was placed in a crosslinking solution (11.48 g of 98% concentrated sulfuric acid, 3.5 g of sodium sulfate, 4.16 g of 50% glutaraldehyde aqueous solution, formulated into a constant volume of 50 ml of an aqueous solution) for 10 minutes. After being washed with water, dried and collected, a spider silk-like fiber was obtained. The fiber was tested, and the test results were shown in FIG. 10. As for the obtained fiber, the body had a diameter of 27 microns, the spindle knots had a radial height of 70-90 microns and an axial length of 110-480 microns, and the spacing of the spindle knots was 90-2400 microns.

Example C4

8 g of polyvinyl alcohol (PVA 1799, Aladdin, polymerization degree of 1700, alcoholysis degree of 99%) and 1.2 g of polystyrene porous microspheres (commercially available from Huizhi Biology, the average particle size of 60 microns, the pore diameter of 20-50 nm, and the porosity of 20-30%) were dispersed in 42 g of 1,4-dioxane (DMSO), stirred and heated at 90° C. for 2 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 8 times the original length, to produce a spider silk-like fiber. As for the obtained fiber, the body had a diameter of 28 microns, the spindle knots had a radial height of 70-90 microns and an axial length of 100-400 microns, and the spacing of the spindle knots was 70-3000 microns.

Example C5

8 g of polyvinyl alcohol (PVA 2499, Aladdin, polymerization degree of 2400, alcoholysis degree of 99%) and 1.2 g of polystyrene porous microspheres (commercially available from Huizhi Biology, the average particle size of 80 microns, the pore diameter of 20-50 nm, and the porosity of 20-30%) were dispersed in 42 g of water, stirred and heated at 90° C. for 2 hours to obtain a uniform spinning dope. At room temperature, the above spinning dope was extruded into a coagulation bath (a sodium sulfate aqueous solution, 420 g/L) via a peristaltic pump for spinning: the actual extrusion rate was 0.02 ml/min, the model of the spinneret was 25 G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 8 times the original length, to produce a spider silk-like polymer fiber. As for the obtained fiber, the body had a diameter of 27 microns, the spindle knots had a radial height of 90-140 microns and an axial length of 150-450 microns, and the spacing of the spindle knots was 70-3000 microns.

Example E1

7 g of polyvinyl alcohol (PVA 1799, Aladdin, polymerization degree of 1700, alcoholysis degree of 99%) and 0.7 g of a molecular sieve (commercially available from Aladdin, 80-100 meshes, the pore diameter: 5 Å, the porosity: 40-50%) were dispersed in 43 g of 1,4-dioxane (DMSO), stirred and heated at 85° C. for 3 hours to obtain a uniform spinning dope. At room temperature, the above spinning dope was extruded into methanol via a peristaltic pump for spinning: the actual extrusion rate was 0.08 ml/min, the model of the spinneret was 22 G (the diameter of 410 microns), the taking-up rate was 0.1 m/min, and the fiber was in the coagulation bath for at least 5 minutes; after thoroughly drying and collecting, a primary fiber was obtained; it was thermally stretched at 180° C. to 6 times the original length, to produce the spider silk-like fiber. As for the obtained fiber, the body had a diameter of 80 microns, the spindle knots had a radial height of 140-210 microns and an axial length of 200-650 microns, and the spacing of the spindle knots was 100-3000 microns.

Example C6

10 g of polyacrylonitrile (commercially available from Sigma-Aldrich (Shanghai) Trading Co., Ltd., having a weight average molecular weight of 150000) and 1.5 g of polystyrene porous microspheres (commercially available from Huizhi Biology, the average particle size of 60 microns, the pore diameter of 20-50 nm, and the porosity of 20-30%) were dispersed in 40 g of N,N-dimethylformamide (DMF), stirred and heated at 60° C. for 3 hours to obtain a uniform spinning dope. At room temperature, the above spinning dope was extruded into a coagulation bath (a mixed solution of water and DMF with 50 weight parts of DMF based on 100 weight parts of water) via a peristaltic pump for spinning: the actual extrusion rate was 0.02 ml/min, the model of the spinneret was 25 G (the diameter of 260 microns), the taking-up rate was 0.1 m/min, and the fiber was in the coagulation bath for at least 5 minutes; after thoroughly drying and collecting, a primary fiber was obtained; it was thermally stretched at 95° C. to 8 times the original length, to produce a spider silk-like fiber. As for the obtained fiber, the body had a diameter of 25 microns, the spindle knots had a radial height of 70-95 microns and an axial length of 120-400 microns, and the spacing of the spindle knots was 100-2800 microns.

Example C7

7 g of polyvinyl alcohol (PVA 1799, Aladdin, polymerization degree of 1700, alcoholysis degree of 99%) and 2.8 g of polystyrene porous microspheres (IPE-PST30, commercially available from National Engineering Research Center for Biotechnology, the average particle size of 30 microns, the pore diameter of 20-120 nm, and the porosity of 20-50%) were dispersed in 43 g of 1,4-dioxane (DMSO), stirred and heated at 80° C. for 2 hours to obtain a uniform spinning dope. At room temperature, the above spinning dope was extruded into methanol via a peristaltic pump for spinning: the actual extrusion rate was 0.02 ml/min, the model of the spinneret was 25 G (the diameter of 260 microns), the taking-up rate was 0.1 m/min, and the fiber was in the coagulation bath for at least 5 minutes; after thoroughly drying and collecting, a primary fiber was obtained; at 180° C., it was thermally stretched to 8 times the original length, to produce the spider silk-like fiber for testing. As for the obtained fiber, the body had a diameter of 25 microns, the spindle knots had a radial height of 41-76 microns and an axial length of 80-510 microns, and the spacing of the spindle knots was 70-1100 microns.

Example C8

10 g of polyurethane (commercially available from Shandong Dongchen Engineering Plastics Co., Ltd. Brand: WANTHANE® WHT-8170) and 1.5 g of silica porous microspheres (the same as that of Example 1) were dispersed in 30 g of N,N-dimethylformamide (DMF), stirred and heated at 80° C. for 2 hours to obtain a uniform spinning dope. At room temperature, the above spinning dope was extruded into a coagulation bath (a mixed solution of water and DMF with 40 weight parts of DMF based on 100 weight parts of water) via a peristaltic pump for spinning: the actual extrusion rate was 0.01 ml/min, the model of the spinneret was 25 G (the diameter of 260 microns), the taking-up rate was 0.4 m/min, and the fiber was in the coagulation bath for at least 5 minutes; after thoroughly drying and collecting, a primary fiber was obtained; it was stretched to 10 times the original length, to produce a spider silk-like fiber. As for the obtained fiber, the body had a diameter of 26 microns, the spindle knots had a radial height of 35-77 microns and an axial length of 60-400 microns, and the spacing of the spindle knots was 220-2600 microns.

Example D1

7 g of polyvinyl alcohol (PVA 1799, Aladdin, polymerization degree of 1700, alcoholysis degree of 99%) and 1.05 g of polystyrene porous microspheres (IPE-PST30, commercially available from National Engineering Research Center for Biotechnology, the average particle size of 30 microns, the pore diameter of 20-120 nm, and the porosity of 20-50%) were dispersed in 43 g of 1,4-dioxane (DMSO), stirred and heated at 80° C. for 2 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 10 times the original length, to produce the spider silk-like fiber. As for the obtained fiber, the body had a diameter of 23 microns, the spindle knots had a radial height of 40-60 microns and an axial length of 70-400 microns, and the spacing of the spindle knots was 90-2600 microns. The above fiber was tested for its mechanical properties, and its tensile strength at break was 316±16 MPa.

Example D2

7 g of polyvinyl alcohol (PVA 1799, Aladdin, polymerization degree of 1700, alcoholysis degree of 99%) and 2.1 g of polystyrene porous microspheres (IPE-PST30, commercially available from National Engineering Research Center for Biotechnology, the average particle size of 30 microns, the pore diameter of 20-120 nm, and the porosity of 20-50%) were dispersed in 43 g of 1,4-dioxane (DMSO), stirred and heated at 80° C. for 2 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 8 times the original length, to produce the spider silk-like fiber. As for the obtained fiber, the body had a diameter of 25 microns, the spindle knots had a radial height of 35-60 microns and an axial length of 80-430 microns, and the spacing of the spindle knots was 60-1300 microns.

Example D3

6 g of polyvinyl alcohol (PVA 2499, Aladdin, polymerization degree of 2400, alcoholysis degree of 99%) and 0.9 g of polystyrene porous microspheres (IPE-PST30, commercially available from National Engineering Research Center for Biotechnology, the average particle size of 30 microns, the pore diameter of 20-120 nm, and the porosity of 20-50%) were dispersed in 44 g of 1,4-dioxane (DMSO), stirred and heated at 80° C. for 3 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 8 times the original length, to produce the spider silk-like fiber. As for the obtained fiber, the body had a diameter of 22 microns, the spindle knots had a radial height of 33-55 microns and an axial length of 70-450 microns, and the spacing of the spindle knots was 70-2600 microns.

Example D4

6 g of polyvinyl alcohol (PVA 2499, Aladdin, polymerization degree of 2400, alcoholysis degree of 99%) and 0.9 g of polystyrene porous microspheres (IPE-PST30, commercially available from National Engineering Research Center for Biotechnology, the average particle size of 30 microns, the pore diameter of 20-120 nm, and the porosity of 20-50%) were dispersed in 44 g of 1,4-dioxane (DMSO), stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.02 ml/min, the model of the spinneret was 25 G (the diameter of 260 microns), the taking-up rate was 0.4 m/min, and the fiber was in the coagulation bath for at least 5 minutes; after thoroughly drying and collecting, a primary fiber was obtained; it was thermally stretched at 180° C. to 10 times the original length, to produce the spider silk-like fiber. As for the obtained fiber, the body had a diameter of 16 microns, the spindle knots had a radial height of 40-70 microns and an axial length of 90-350 microns, and the spacing of the spindle knots was 90-2400 microns.

Example D5

7 g of polyvinyl alcohol (PVA 1799, Aladdin, polymerization degree of 1700, alcoholysis degree of 99%) and 0.7 g of polystyrene porous microspheres (commercially available from Huizhi Biology, the average particle size of 60 microns, the pore diameter of 20-50 nm, and the porosity of 20-30%) were dispersed in 43 g of water, stirred and heated at 75° C. for 4 hours to obtain a uniform spinning dope. At 45° C., the above spinning dope was extruded into a sodium sulfate aqueous solution (420 g/L) via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; after it was thermally stretched at 180° C. to 8 times the original length, it was placed in a crosslinking solution (11.48 g of 98% concentrated sulfuric acid, 3.5 g of sodium sulfate, 4.16 g of 50% glutaraldehyde aqueous solution, formulated into a constant volume of 50 ml of an aqueous solution) for 10 minutes. After being washed with water, dried and collected, a spider silk-like polymer fiber was obtained. As for the obtained fiber, the body had a diameter of 29 microns, the spindle knots had a radial height of 70-90 microns and an axial length of 100-400 microns, and the spacing of the spindle knots was 140-2900 microns.

Example D6

7 g of polyvinyl alcohol (PVA 1799, Aladdin, polymerization degree of 1700, alcoholysis degree of 99%) and 0.35 g of polystyrene porous microspheres (IPE-PST30, commercially available from National Engineering Research Center for Biotechnology, the average particle size of 30 microns, the pore diameter of 20-120 nm, and the porosity of 20-50%) were dispersed in 43 g of 1,4-dioxane (DMSO), stirred and heated at 80° C. for 2 hours to obtain a uniform spinning dope. At room temperature, the above spinning dope was extruded into methanol via a peristaltic pump for spinning: the actual extrusion rate was 0.02 ml/min, the model of the spinneret was 25G (the diameter of 260 microns), the taking-up rate was 0.1 m/min, and the fiber was in the coagulation bath for at least 5 minutes; after thoroughly drying and collecting, a primary fiber was obtained; it was thermally stretched at 180° C. to 10 times the original length, to produce the spider silk-like fiber. As for the obtained fiber, the body had a diameter of 24 microns, the spindle knots had a radial height of 34-60 microns and an axial length of 70-300 microns, and the spacing of the spindle knots was 180-4100 microns.

Example D7

10 g of polyurethane (commercially available from Shandong Dongchen Engineering Plastics Co., Ltd. Brand:

WANTHANE® WHT-8170) and 1 g of polystyrene microspheres (IPE-PST30, commercially available from National Engineering Research Center for Biotechnology, the average particle size of 30 microns, the pore diameter of 20-120 nm, and the porosity of 20-50%) were dispersed in 30 g of N,N-dimethylformamide (DMF), stirred and heated at 80° C. for 2 hours to obtain a uniform spinning dope. At room temperature, the above spinning dope was extruded into a coagulation bath (a mixed solution of water and DMF with 40 weight parts of DMF based on 100 weight parts of water) via a peristaltic pump for spinning: the actual extrusion rate was 0.01 ml/min, the model of the spinneret was 25G (the diameter of 260 microns), the taking-up rate was 0.4 m/min, and the fiber was in the coagulation bath for at least 5 minutes; after thoroughly drying and collecting, a primary fiber was obtained; it was stretched to 10 times the original length, to produce the spider silk-like fiber. As for the obtained fiber, the body had a diameter of 27 microns, the spindle knots had a radial height of 35-80 microns and an axial length of 60-300 microns, and the spacing of the spindle knots was 170-3200 microns.

Example E2

10 g of polyacrylonitrile (commercially available from Sigma-Aldrich (Shanghai) Trading Co., Ltd., having a weight average molecular weight of 150000) and 1 g of a molecular sieve (commercially available from Aladdin, 80-100 meshes, the pore diameter: 5 Å, the porosity: 40-50%) were dispersed in 40 g of N,N-dimethylformamide (DMF), stirred and heated at 50° C. for 5 hours to obtain a uniform spinning dope. At room temperature, the above spinning dope was extruded into a coagulation bath (a mixed solution of water and DMF with 80 weight parts of DMF based on 100 weight parts of water) via a peristaltic pump for spinning: the actual extrusion rate was 0.05 ml/min, the model of the spinneret was 22G (the diameter of 410 microns), the taking-up rate was 0.2 m/min, and the fiber was in the coagulation bath for at least 5 minutes; after thoroughly drying and collecting, a primary fiber was obtained; it was thermally stretched at 95° C. to 5 times the original length, to produce the spider silk-like fiber. As for the obtained fiber, the body had a diameter of 60 microns, the spindle knots had a radial height of 150-200 microns and an axial length of 200-630 microns, and the spacing of the spindle knots was 90-3500 microns.

Example F 7 g of polyvinyl alcohol (PVA 1799, Aladdin, polymerization degree of 1700, alcoholysis degree of 99%) and 1.4 g of glass microspheres (commercially available from Suzhou Huanixi Chemical Co., Ltd., non-porous solid glass microspheres, 15-30 microns) were dispersed in 43 g of 1,4-dioxane (DMSO), stirred and heated at 80° C. for 2 hours to obtain a uniform spinning dope. At room temperature, the above spinning dope was extruded into a coagulation bath (a mixed solution of methanol and DMSO with 20 weight parts of DMSO based on 100 weight parts of methanol) via a peristaltic pump for spinning: the actual extrusion rate was 0.01 ml/min, the model of the spinneret was 25G (circular, the diameter of 260 microns), the taking-up rate was 0.42 m/min, and the fiber was in the coagulation bath for at least 5 minutes. The obtained fiber was thoroughly dried in the air and then was collected to produce a spider silk-like polymer fiber. The fiber was tested for its mechanical properties, and its tensile strength at break was 54±10 MPa.

As found by observing and measuring with the contact angle measuring instrument, for all spider silk-like polymer fibers obtained in the examples according to the invention, under high humidity, small liquid droplets were first formed on the surface of the fibers randomly, and subsequently, the liquid droplets directionally move from the surroundings of the spindle knot structures towards the central protrusions, to form large liquid droplets. In contrast, as for the pure polyvinyl alcohol fiber as prepared according to Comparative Example A1, under high humidity, small liquid droplets were first formed on the surface of the fiber randomly, but subsequently, the liquid droplets do not directionally move.

The invention claimed is:

1. A polymer fiber, comprising:
a matrix polymer and an additive dispersed therein,
and having a fiber body and a plurality of spindle knot structural units disposed along the fiber body,
wherein each spindle knot structural unit contains one or a plurality of microparticles, and has a radial height greater than a diameter of the fiber body,
wherein the additive comprises microparticles having an average particle size of 0.1-1000 microns, and each of the microparticles is porous or is an agglomerate of a plurality of nanoparticles.

2. The polymer fiber according to claim 1, wherein each spindle knot structural unit has a radial height of 10-300 microns, an axial length of 10-1000 microns, and a spacing between two adjacent spindle knot structural unit is 10-5000 microns.

3. The polymer fiber according to claim 1, wherein the fiber body has a diameter of 5-250 microns.

4. The polymer fiber according to claim 1, wherein the polymer fiber comprises 1-50 wt. % of the microparticles based on the weight of the matrix polymer in the polymer fiber.

5. The polymer fiber according to claim 1, wherein the microparticles have an average particle size of 0.5-200 microns.

6. The polymer fiber according to claim 1, wherein the polymer fiber comprises 1-50 wt. % of the porous microparticles, based on a weight of the matrix polymer in the polymer fiber.

7. The polymer fiber according to claim 1, wherein the porous microparticles have a porosity of 10-80%, and a pore diameter of 0.1-200 nm, as measured according to the standard GB/T21650.

8. The polymer fiber according to claim 1, wherein the porous microparticles are spherical porous microparticles.

9. The polymer fiber according to claim 8, wherein the polymer fiber comprises 1-49 wt. % of the spherical porous microparticles, based on a weight of the matrix polymer in the polymer fiber.

10. The polymer fiber according to claim 8, wherein the spherical porous microparticles are selected from the group consisting of silica porous microspheres, polystyrene porous microspheres, calcium carbonate porous microspheres, epoxy resin porous microspheres, polylactic acid porous microspheres, phenolic resin porous microspheres, chitosan porous microspheres, carbon porous microspheres, hydroxyapatite porous microspheres, gelatin porous microspheres, metal porous microspheres, and combinations thereof.

11. The polymer fiber according to claim 10, wherein the porous microparticles are silica porous microspheres and the polymer fiber comprises 1-45 wt. % of the silica porous microspheres, based on a weight of the matrix polymer in the polymer fiber.

12. The polymer fiber according to claim 10, wherein the porous microparticles are polystyrene porous microspheres and the polymer fiber comprises 1-46 wt. % of the polystyrene porous microspheres, based on a weight of the matrix polymer in the polymer fiber.

13. The Polymer fiber according to claim 1, wherein the porous microparticles are non-spherical porous microparticles.

14. The polymer fiber according to claim 13, wherein the polymer fiber comprises 1-48 wt. % of the non-spherical porous microparticles, based on the weight of the matrix polymer in the polymer fiber.

15. The polymer fiber according to claim 13, wherein the non-spherical porous microparticles are selected from the group consisting of molecular sieves, silica gel for column chromatography, non-spherical polystyrene microparticles, non-spherical titanium dioxide porous microparticles and combinations thereof.

16. The polymer fiber according to claim 15, wherein the porous microparticle is a silica gel for column chromatography, and the polymer fiber comprises 1-44 wt. % of the silica gel for column chromatography, based on the weight of the matrix polymer in the polymer fiber.

17. The polymer fiber according to claim 1, wherein the agglomerate of a plurality of nanoparticles is spray-dried powder rubber.

18. The polymer fiber according to claim 17, wherein the polymer fiber comprises 1-50 wt. % of the spray-dried powder rubber, based on the weight of the matrix polymer in the polymer fiber.

19. The polymer fiber according to claim 17, wherein the spray-dried powder rubber has an average particle size of 10-100 microns.

20. The polymer fiber according to claim 17, wherein the spray-dried powder rubber is a fully-vulcanized powder rubber.

21. The polymer fiber according to claim 1, wherein the matrix polymer is a polymer suitable for wet spinning.

22. The polymeric fiber according to claim 21, wherein the matrix polymer is selected from the group consisting of polyacrylonitrile, polyurethane, polyvinyl alcohol, viscose fiber, nylon, cellulose sulfonate, cellulose acetate, polyvinyl chloride, polyisophthalamide, poly(p-phenylene terephthamide), and blends and copolymers thereof.

23. The polymer fiber according to claim 22, wherein the polyvinyl alcohol has a polymerization degree of 400-4000, and an alcoholysis degree of 55%-99%.

24. The polymer fiber according to claim 1, prepared by a process comprising the steps of:
(1) dispersing the matrix polymer and the microparticles in a solvent, wherein the matrix polymer of the fiber is dissolved in the solvent to form a solution and the microparticles are uniformly dispersed in the solution, thereby to obtain a uniform spinning dope;
(2) formulating a corresponding coagulation bath; and
(3) spinning with the spinning dope by extruding the spinning dope into the coagulation bath, and after coagulating and drying, collecting the product to obtain a primary fiber.

25. The polymer fiber according to claim 24, wherein the microparticles are porous microparticles and the process further comprises step (4) of stretching the primary fiber to obtain the polymer fiber.

26. A process of preparing a polymer fiber according to claim 1, comprising the steps of:
(1) dispersing the matrix polymer of the fiber and the microparticles in a solvent, wherein the matrix polymer of the fiber is dissolved in the solvent to form a solution and the microparticles are uniformly dispersed in the solution, thereby obtaining a uniform spinning dope;
(2) formulating a corresponding coagulation bath; and
(3) spinning with the spinning dope by extruding the spinning dope into the coagulation bath, and after coagulating and drying, collecting the product to obtain a primary fiber.

27. The process according to claim 26, wherein the microparticles are porous microparticles and the process further comprises step (4) of stretching the primary fiber to obtain a polymer fiber.

28. The process according to claim 26, wherein in step (1), the matrix polymer is in an amount of 5-50 weight parts, based on 100 weight parts of the solvent.

29. The process according to claim 26, wherein, in step (1), the solvent is selected from the group consisting of 1,4-dioxane, N,N-dimethylformamide, tetrahydrofuran, water, sulfuric acid, and combinations thereof.

30. The process according to claim 26, wherein, in step (2), the coagulation bath is selected from the group consisting of a sodium sulfate aqueous solution, methanol, ethyl acetate, water, 1,4-dioxane, N,N-dimethylformamide, and combinations thereof.

31. The process according to claim 26, wherein the matrix polymer is polyvinyl alcohol, the solvent is 1,4-dioxane, and the coagulation bath is selected from the group consisting of methanol, ethyl acetate, and a binary solution consisting of methanol and 1,4-dioxane.

32. The process according to claim 26, wherein the process further comprises the crosslinking step by immersing the primary fiber obtained from step (3) or the polymer fiber obtained from step (4) in a crosslinking solution, washing with water, drying, and collecting the resulting product.

33. The process according to claim 32, wherein the matrix polymer is polyvinyl alcohol and the crosslinking solution is an aqueous solution comprising an acid, an aldehyde, and, optionally, sodium sulfate.

34. A water collecting material, comprising a polymer fiber according to claim 1.

35. The water collecting material according to claim 34, wherein the water-collecting material is configured to collect moisture in the air in islands, coastal deserts, or foggy mountainous areas, or for dispersing and dissipating dense fog around airports, highways, or light houses.

36. The polymer fiber according to claim 2, wherein each spindle knot structural unit has a radial height of 30-150 microns.

37. The polymer fiber according to claim 2, wherein each spindle knot structural unit has an axial length of 100-300 microns.

38. The polymer fiber according to claim 2, wherein the spacing between two adjacent spindle knot structural units is 100-1000 microns.

39. The polymer fiber according to claim 3, wherein the fiber body has a diameter of 10-150 microns.

40. The polymer fiber according to claim 3, wherein the fiber body has a diameter of 20-50 microns.

41. The polymer fiber according to claim 5, wherein the microparticles have an average particle size of 10-100 microns.

42. The polymer fiber according to claim 6, wherein the polymer fiber comprises 3-40 wt. % of the porous microparticles, based on the weight of the matrix polymer in the polymer fiber.

43. The polymer fiber according to claim 6, wherein the polymer fiber comprises 5-30 wt. % of the porous microparticles, based on the weight of the matrix polymer in the polymer fiber.

44. The polymer fiber according to claim 6, wherein the polymer fiber comprises 5-25 wt. % of the porous microparticles, based on the weight of the matrix polymer in the polymer fiber.

45. The polymer fiber according to claim 6, wherein the polymer fiber comprises 5-20 wt. % of the porous microparticles, based on the weight of the matrix polymer in the polymer fiber.

46. The polymer fiber according to claim 7, wherein the porous microparticles have a porosity of 20-50%, as measured according to the standard GB/T21650.

47. The polymer fiber according to claim 7, wherein the porous microparticles have a pore diameter of 1-50 nm, as measured according to the standard GB/T21650.

48. The polymer fiber according to claim 8, wherein the spherical porous microparticles have an average particle size of 10-150 microns.

49. The polymer fiber according to claim 8, wherein the spherical porous microparticles have an average particle size of 20-100 microns.

50. The polymer fiber according to claim 9, wherein the polymer fiber comprises 3-40 wt. % of the spherical porous microparticles, based on the weight of the matrix polymer in the polymer fiber.

51. The polymer fiber according to claim 9, wherein the polymer fiber comprises 5-30 wt. % of the spherical porous microparticles, based on the weight of the matrix polymer in the polymer fiber.

52. The polymer fiber according to claim 9, wherein the polymer fiber comprises 5-25 wt. % of the spherical porous microparticles, based on the weight of the matrix polymer in the polymer fiber.

53. The polymer fiber according to claim 11, wherein the polymer fiber comprises 5-30 wt. % of the silica porous microspheres, based on the weight of the matrix polymer in the polymer fiber.

54. The polymer fiber according to claim 11, wherein the polymer fiber comprises 5-25 wt. % of the silica porous microspheres, based on the weight of the matrix polymer in the polymer fiber.

55. The polymer fiber according to claim 12, wherein the polymer fiber comprises 5-30 wt. % of the polystyrene porous microspheres, based on the weight of the matrix polymer in the polymer fiber.

56. The polymer fiber according to claim 12, wherein the polymer fiber comprises 5-25 wt. % of the polystyrene porous microspheres, based on the weight of the matrix polymer in the polymer fiber.

57. The Polymer fiber according to claim 13, wherein the non-spherical porous microparticles have an average particle size of 60-12500 meshes, as determined using the sieving method.

58. The Polymer fiber according to claim 13, wherein the non-spherical porous microparticles have an average particle size of 80-1250 meshes, as determined using the sieving method.

59. The Polymer fiber according to claim 13, wherein the non-spherical porous microparticles have an average particle size of 80-600 meshes, as determined using the sieving method.

60. The polymer fiber according to claim 14, wherein the polymer fiber comprises 3-40 wt. % of the non-spherical porous microparticles, based on the weight of the matrix polymer in the polymer fiber.

61. The polymer fiber according to claim 14, wherein the polymer fiber comprises 5-30 wt. % of the non-spherical porous microparticles, based on the weight of the matrix polymer in the polymer fiber.

62. The polymer fiber according to claim 14, wherein the polymer fiber comprises 5-25 wt. % of the non-spherical porous microparticles, based on the weight of the matrix polymer in the polymer fiber.

63. The polymer fiber according to claim 16, wherein the silica gel for column chromatography has an average particle size of 60-400 meshes, as determined by the sieving method.

64. The polymer fiber according to claim 16, wherein the silica gel for column chromatography has an average particle size of 80-300 meshes, as determined by the sieving method.

65. The polymer fiber according to claim 16, wherein the polymer fiber comprises 5-30 wt. % of the silica gel for column chromatography, based on the weight of the matrix polymer in the polymer fiber.

66. The polymer fiber according to claim 16, wherein the polymer fiber comprises 5-25 wt. % of the silica gel for column chromatography, based on the weight of the matrix polymer in the polymer fiber.

67. The polymer fiber according to claim 18, wherein the polymer fiber comprises 9-29 wt. % of the spray-dried powder rubber, based on the weight of the matrix polymer in the polymer fiber.

68. The polymer fiber according to claim 18, wherein the polymer fiber comprises 19-29 wt. % of the spray-dried powder rubber, based on the weight of the matrix polymer in the polymer fiber.

69. The polymer fiber according to claim 19, wherein the spray-dried powder rubber has an average particle size of 20-50 microns.

70. The polymer fiber according to claim 20, wherein the spray-dried powder rubber is at least one selected from the group consisting of fully-vulcanized powder natural rubber, fully-vulcanized powder styrene-butadiene rubber, fully-vulcanized powder carboxylated styrene-butadiene rubber, fully-vulcanized powder nitrile butadiene rubber, fully-vulcanized powder carboxylated nitrile butadiene rubber, fully-vulcanized powder polybutadiene rubber, fully-vulcanized powder silicone rubber, fully-vulcanized powder chloroprene rubber, fully-vulcanized powder acrylate rubber, fully-vulcanized powder styrene-butadiene-vinylpyridine rubber, fully-vulcanized powder isoprene rubber, fully-vulcanized powder butyl rubber, fully-vulcanized powder polysulfide rubber, fully-vulcanized powder acrylate-butadiene rubber, fully-vulcanized powder polyurethane rubber, fully-vulcanized powder fluoro rubber, and fully-vulcanized powder ethylene-vinyl acetate rubber.

71. The polymer fiber according to claim 20, wherein the fully-vulcanized powder rubber has a gel content of 60 wt. % or more.

72. The polymer fiber according to claim 20, wherein the fully-vulcanized powder rubber has a gel content of 75 wt. % or more.

73. The polymer fiber according to claim 20, wherein the fully-vulcanized powder rubber has a gel content of 80 wt. % or more.

74. The polymeric fiber according to claim 22, wherein the polyisophthalamide is poly(m-phenylene isophthalamide).

75. The polymer fiber according to claim 23, wherein the polyvinyl alcohol has a polymerization degree of 1000-2500.

76. The polymer fiber according to claim 23, wherein the polyvinyl alcohol has an alcoholysis degree of 88%-99%.

77. The process according to claim 33, wherein the acid is an inorganic acid selected from the group consisting of hydrochloric acid, sulfuric acid, and combinations thereof.

78. The process according to claim 33, wherein the aldehyde is selected from the group consisting of formaldehyde, glutaraldehyde, and combinations thereof.

* * * * *